US009591459B2

(12) United States Patent
Dhanda et al.

(10) Patent No.: US 9,591,459 B2
(45) Date of Patent: Mar. 7, 2017

(54) SIGNALING WHETHER A NETWORK HAS BROADCAST SYSTEM INFORMATION

(75) Inventors: Mungal Singh Dhanda, Slough (GB); Vikrant Jain, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/440,875

(22) Filed: Apr. 5, 2012

(65) Prior Publication Data

US 2013/0094424 A1  Apr. 18, 2013

Related U.S. Application Data

(60) Provisional application No. 61/473,638, filed on Apr. 8, 2011.

(51) Int. Cl.
*H04H 20/71* (2008.01)
*H04W 4/06* (2009.01)
*H04W 48/12* (2009.01)
*H04W 4/16* (2009.01)
*H04W 48/08* (2009.01)

(52) U.S. Cl.
CPC ............ *H04W 4/06* (2013.01); *H04W 48/12* (2013.01); *H04W 4/16* (2013.01); *H04W 48/08* (2013.01)

(58) Field of Classification Search
None
See application file for complete search history.

(56) References Cited

U.S. PATENT DOCUMENTS

| 8,340,678 | B1* | 12/2012 | Pandey | H04W 72/04 370/468 |
|---|---|---|---|---|
| 2008/0130493 | A1* | 6/2008 | Kanauchi | H04L 47/14 370/229 |
| 2010/0302237 | A1* | 12/2010 | Aramaki | 345/419 |
| 2011/0053588 | A1 | 3/2011 | Al-Khudairi et al. | |
| 2011/0143712 | A1 | 6/2011 | Christensson et al. | |
| 2011/0171929 | A1 | 7/2011 | Tamura et al. | |
| 2011/0194477 | A1 | 8/2011 | Damnjanovic et al. | |
| 2011/0201307 | A1* | 8/2011 | Segura | H04W 48/02 455/411 |

(Continued)

FOREIGN PATENT DOCUMENTS

| JP | 2010516163 A | 5/2010 |
| WO | WO-2008093985 A1 | 8/2008 |
| WO | WO-2010032477 A1 | 3/2010 |

OTHER PUBLICATIONS

ETSI MCC, CRs TO gsm 04.18(EDGE), Nov. 11, 1999, SMG P-99-602.*

(Continued)

*Primary Examiner* — Kwang B Yao
*Assistant Examiner* — Hardikkumar Patel
(74) *Attorney, Agent, or Firm* — Michael J. DeHaemer, Jr.; James Hunt Yancey, Jr.

(57) ABSTRACT

Devices, systems, articles of manufacture, and methods for signaling a broadcast of a message are described. According to some embodiments, a first message to be broadcast in a cell is determined. The first message includes barring indications. A second message is generated. The second message is a System Information Type 3 message and includes an indication that the first message is to be broadcast. The second message is broadcast. Other aspects, embodiments, and features are also claimed and described.

56 Claims, 15 Drawing Sheets

(56) References Cited

U.S. PATENT DOCUMENTS

| | | | |
|---|---|---|---|
| 2012/0039313 A1* | 2/2012 | Jain | 370/338 |
| 2012/0149361 A1* | 6/2012 | Esch | H04W 48/12 |
| | | | 455/422.1 |

OTHER PUBLICATIONS

Telefon AB LM Ericsson et al: "Realizing Extended Access Barring", Mar. 3, 2011.*

Digital cellular telecommunications system (Phase 2); Mobile radio interface layer 3 specification; Radio Resource Control (RRC) protocol (3GPP TS 44.018 version 10.2.0 Release 10), Technical specification, European telecommunications standards institute (Etsi), 650, route des lucioles;F-06921 sophia-antipolis; France, vol. 3gpp Geran 2, No. V10.2.0, Mar. 1, 2011 (Mar. 1, 2011), XP014065422.

ETSI TS 144 018 V10.3.0 (Jun. 2011) Digital cellular telecommunications system (Phase 2+); Mobile radio interface layer 3 specification; Radio Resource Control (RRC) protocol (3GPP TS 44.018 version 10.3.0 Release 10).

International Search Report and Written Opinion—PCT/US2012/032641—ISA/EPO—Jun. 21, 2012.

Qualcomm Incorporated: "Mechanism to Signal If Network Broadcasts SI 21", 3GPP Draft; GP-110650-S121 Indication, 3rd Generation Partnership Project (3GPP), Mobile Competence Centre ; 650, Route Des Lucioles ; F-06921 Sophia-Antipolis Cedex ; France, vol. TSG Geran, No. Dallas; May 16, 2011, May 10, 2011 (May 10, 2011), XP050486813.

Telefon AB LM Ericsson, ST-Ericsson, 3GPP TSG-GERAN Meeting #49, GB-110355, "Realizing Extended Access Barring," Telefon AB LM Ericsson, ST-Ericsson, Chengdu, China, Feb. 28-Mar. 4, 2011.

Notification of Transmittal of the International Preliminary Report on Patentability—International Preliminary Examining Authority PCT/US2012/032641.

Response to Second Written Opinion Under Article 34—International Searching Authority (ISA/EP) PCT/2012-032641.

Telefon AB LM Ericsson, ST-Ericsson, "Realizing Extended Access Barring", 3GPP TSG GERAN #49 GP-110277, Feb. 24, 2011, pp. 1-4.

3GPP TS 45.002 V7.7.0 (May 2008), 3rd Generation Partnership Project; Technical Specification Group GSM/EDGE Radio Access Network; Multiplexing and multiple access on the radio path (Release 7), Jun. 16, 2008, 11 pages.

Taiwan Search Report—TW101112482—TIPO—Apr. 21, 2014.

* cited by examiner

SIGNALING WHETHER A NETWORK HAS BROADCAST SYSTEM INFORMATION

RELATED APPLICATION AND PRIORITY CLAIM

This application is related to and claims priority to U.S. Provisional Patent Application Ser. No. 61/473,638, filed Apr. 8, 2011, for "METHODS & SYSTEMS FOR SIGNALING WHETHER A NETWORK HAS BROADCAST A SYSTEM INFORMATION TYPE 21 MESSAGE," which is incorporated herein by reference for all purposes and as if fully set forth below.

TECHNICAL FIELD

The present disclosure relates generally to communication systems. More specifically, the present disclosure relates to systems and methods for signaling whether a network has broadcast System Information.

BACKGROUND

Wireless communication systems have become an important means by which many people worldwide have come to communicate. A wireless communication system may provide communication for a number of subscriber stations, each of which may be serviced by a base station.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

SUMMARY OF SOME EXAMPLE EMBODIMENTS

Figure 1:
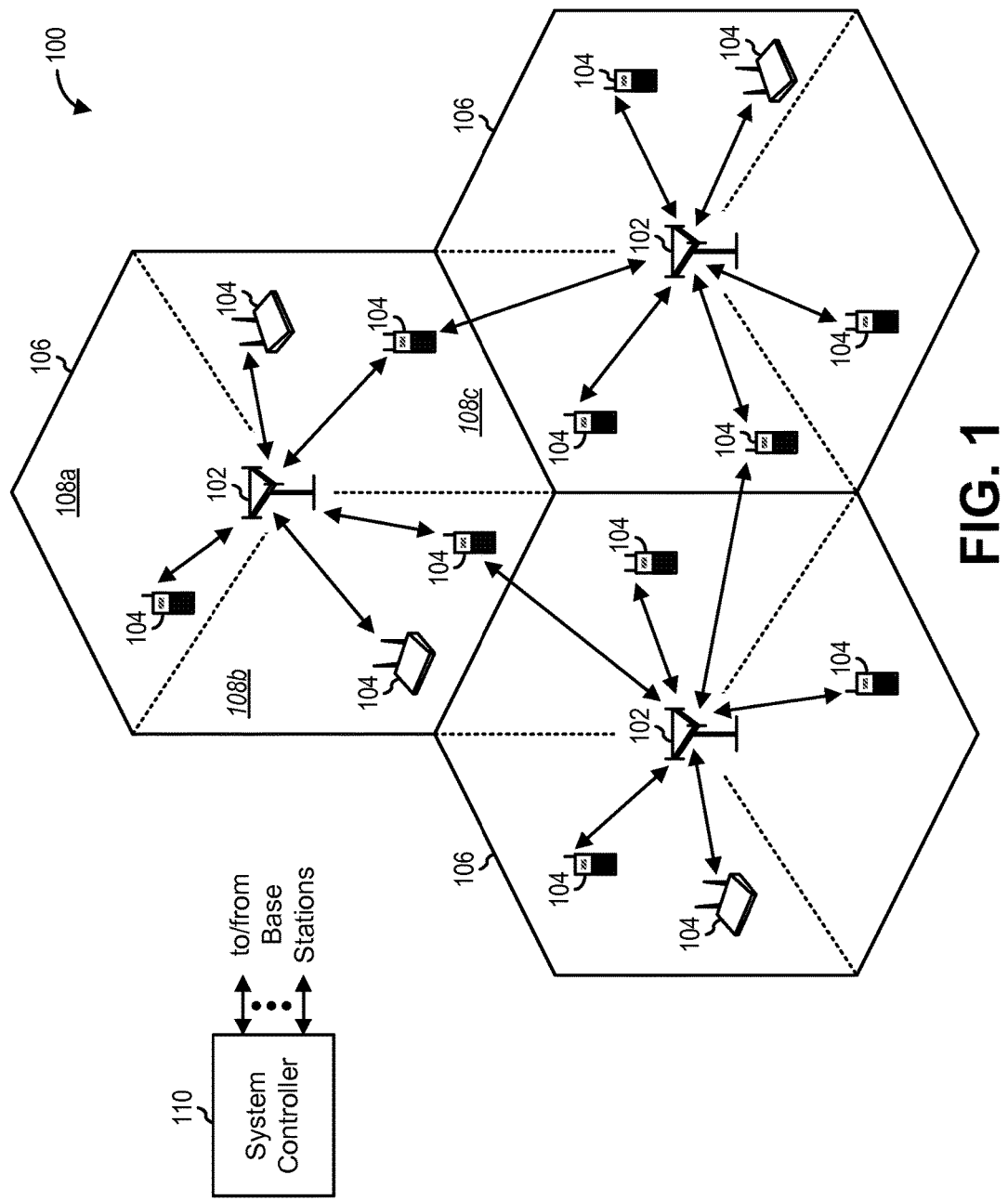
FIG. 1 shows an example of a wireless communication system in which embodiments of the present invention disclosed herein may be utilized.

A method for signaling a broadcast of a message is disclosed. A first message to be broadcast in a cell is determined. The first message includes barring indications. A second message is generated. The second message is a System Information Type 3 message and includes an indication that the first message is to be broadcast. The second message is broadcast.

The indication may be in System Information Type 3 Rest Octets in the System Information Type 3 message. The first message may be a System Information Type 21 message. The System Information Type 3 message may not include a WHERE field. The System Information Type 3 message may include a System Information Type 21 indicator. The System Information Type 3 message may include a System Information Type 21 position indicator. The System Information Type 21 position indicator may be set to BCCH Norm. The System Information Type 21 position indicator may be set to BCCH Extended.

The System Information Type 3 message may include a WHERE field. A System Information Type 9 message may also be generated. The System Information Type 9 message may also be broadcast. The indication of the second message may indicate that the System Information Type 9 message has been broadcast. The System Information Type 9 may include an indication in a System Information Type 9 Rest Octets that indicates that the first message is to be broadcast.

The method may be performed by a base station. The barring indications may include Extended Access Barring information.

An apparatus for signaling a broadcast of a first message is also described. The apparatus includes a processor and executable instructions stored in memory that is in electronic communication with the processor. The apparatus generates a message including access restriction data addressed to at least one determines that a first message is to be broadcast in a cell. The first message includes barring indications. The apparatus also generates a second message that is a System Information Type 3 message. The second message includes an indication that the first message is to be broadcast. The apparatus further broadcasts the second message.

The apparatus may include generating a third message. The third message may indicate that the second message has been broadcast. The apparatus may broadcast the third message. The second message may be a System Information Type 9 message. The third message may be a System Information Type 3 message. The System Information Type 3 message may include a WHERE field. The indication may be in System Information Type 9 Rest Octets in the System Information Type 9 message.

A method for detecting a broadcast of a first message is also described. A second message is received. The second message is decoded. The second message is used to determine whether a first message has been broadcast. The first message includes barring indications.

The first message may be a System Information Type 21 message. The second message may be a System Information Type 3 message. Using the second message to determine whether a System Information Type 21 message has been broadcast may include determining that the second message includes a WHERE field, decoding all fields from System Information Type 3 Rest Octets in the System Information Type 3 message and determining whether the System Information Type 3 Rest Octets includes a System Information Type 21 message indicator.

The System Information Type 3 Rest Octets may not include a System Information Type 21 message indicator. Using the second message to determine whether a System Information Type 21 message has been broadcast may include determining that a System Information Type 21 message may be not broadcast in a cell.

The Information Type 3 Rest Octets may include a System Information Type 21 message indicator. Using the second message to determine whether a System Information Type 21 message has been broadcast may include determining that a System Information Type 21 message may be broadcast in a cell. The System Information Type 3 message may include a System Information Type 21 indicator. The System Information Type 3 message may include a System Information Type 21 position indicator. The System Information Type 21 position indicator may be set to BCCH Norm. The System Information Type 21 position indicator may be set to BCCH Extended.

A third message may be received. The third message may indicate that the second message has been broadcast. It may be determined that the third message does not include a WHERE field. The second message may be a System Information Type 9 message. The third message may be a System Information Type 3 message.

The System Information Type 9 message may not include a System Information Type 21 message indicator. Using the second message to determine whether a System Information Type 21 message has been broadcast may include determining that a System Information Type 21 message may be not broadcast in a cell.

The System Information Type message may include a System Information Type 21 message indicator. Using the second message to determine whether a System Information Type 21 message has been broadcast may include determining that a System Information Type 21 message may be broadcast in a cell. The method may be performed by a wireless communication device. The barring indications may include Extended Access Barring information.

An apparatus for detecting a broadcast of a first message is also described. The apparatus includes a processor and executable instructions stored in memory that is in electronic communication with the processor. The apparatus receives a second message. The apparatus also decodes the second message. The apparatus further uses the second message to determine whether a first message has been broadcast. The first message includes barring indications.

A computer-program product for signaling a broadcast of a System Information Type 21 message is also described. The computer-program product includes a computer-readable medium having instructions thereon. The computer-program product includes instructions for determining that a first message is to be broadcast in a cell. The first message includes barring indications. The computer-program product also includes instructions for generating a second message that includes an indication that the first message is to be broadcast. The computer-program product further includes instructions for broadcasting the second message.

A computer-program product for detecting a broadcast of a first message is also described. The computer-program product includes a computer-readable medium having instructions thereon. The computer-program product includes instructions for receiving a second message. The computer-program product also includes instructions for decoding the second message. The computer-program product further includes instructions for using the second message to determine whether a first message has been broadcast. The first message includes barring indications.

An apparatus for signaling a broadcast of a first message is also described. The apparatus includes means for determining that a first message is to be broadcast in a cell. The first message includes barring indications. The apparatus also includes means for generating a second message that includes an indication that the first message is to be broadcast. The apparatus further includes means for broadcasting the second message.

An apparatus for detecting a broadcast of a first message is also described. The apparatus includes means for receiving a second message. The apparatus also includes means for decoding the second message. The apparatus further includes means for using the second message to determine whether a first message has been broadcast. The first message includes barring indications.

Other aspects, features and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION OF ALTERNATIVE & EXEMPLARY EMBODIMENTS

More and more people are using wireless communication devices, such as, for example, mobile phones, not only for voice but also for data communications. In the GSM/EDGE Radio Access Network (GERAN) specification, General Packet Radio Service (GPRS) and Enhanced GPRS EGPRS provide data services. The standards for GERAN are maintained by the 3GPP (Third Generation Partnership Project). GERAN is a part of GSM. More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data from and to the PSTN and Internet to and from remote terminals. GERAN is also a part of combined UMTS/GSM networks.

When in idle mode, wireless communication devices using $2^{nd}$ generation (2G) wireless telephone technology (e.g., GSM) may regularly monitor neighboring cells' power levels (i.e., signal strength of transmitting neighboring base stations). This is typically done when the wireless communication device "wakes up" to decode the paging channel. Power monitoring may draw extra power from the battery because it involves extra operation time for radio frequency (RF) components and baseband processing components. Power monitoring may also lead to elongating the "awake time" when the amount of monitoring per paging channel (PCH) block is high. The idle mode current consumption, which directly affects the standby time of the wireless communication device, is a key measure in design and manufacturing.

FIG. 1 shows an example of a wireless communication system 100 in which embodiments of the present invention disclosed herein may be utilized. The wireless communication system 100 includes multiple base stations (BS) 102 and multiple wireless communication devices 104. Each base station 102 provides communication coverage for a particular geographic area 106. The term "cell" can refer to a base station 102 and/or its coverage area 106 depending on the context in which the term is used.

The terms "wireless communication device" and "base station" utilized in this application can generally refer to an array of components. For example, as used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers and personal computers. A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. Also, the term "base station" can refer to a wireless communication station that is installed at a fixed location and used to communicate with wireless communication devices 104. A base station 102 may alternatively be referred to as an access point (including nano-, pico- and femto-cells), a Node B, an evolved Node B, a Home Node B or some other similar terminology.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Wireless communication devices (e.g., subscriber stations) 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. As another example, for a distributed architecture, base stations 102 may communicate with one another as needed.

Figure 2:
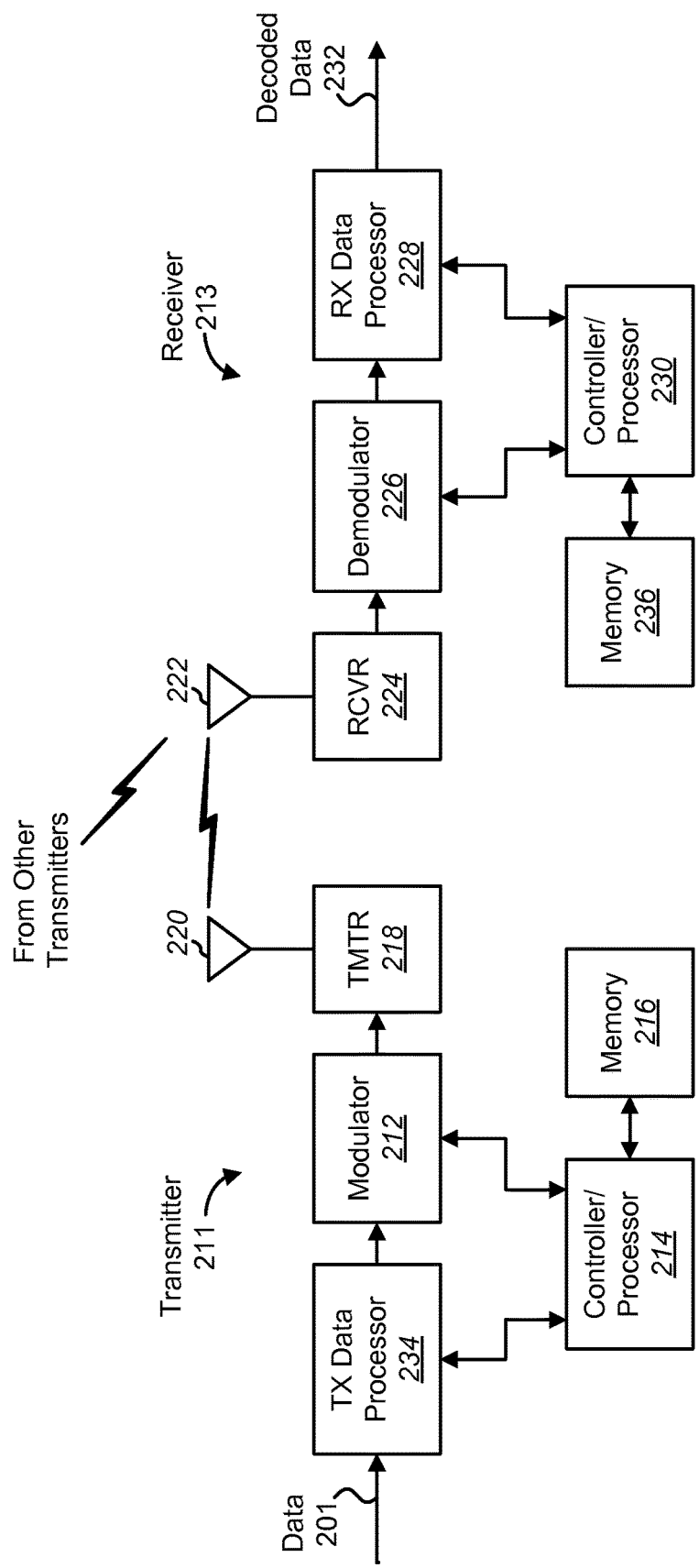
FIG. 2 shows a block diagram of a transmitter and a receiver in a wireless communication system according to some embodiments of the present invention.

FIG. 2 shows a block diagram of a transmitter 211 and a receiver 213 in a wireless communication system 100 according to some embodiments of the present invention. For the downlink, the transmitter 211 may be part of a base station 102 and the receiver 213 may be part of a wireless communication device 104. For the uplink, the transmitter 211 may be part of a wireless communication device 104 and the receiver 213 may be part of a base station 102. In some embodiments, receivers and transmitters can be combined or implemented as a transceiver.

At the transmitter 211, a transmit (TX) data processor 234 receives and processes (e.g., formats, encodes, and interleaves) data 201 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. Gaussian minimum shift keying (GMSK) is a continuous phase modulation protocol whereas 8-PSK is a digital modulation protocol. A transmitter unit (TMTR) 218 conditions (e.g., filters, amplifies, and upconverts) the modulated signal and generates an RF modulated signal, which is transmitted via an antenna 220.

At the receiver 213, an antenna 222 receives RF modulated signals from the transmitter 211 and other transmitters. The antenna 222 provides a received RF signal to a receiver unit (RCVR) 224. The receiver unit 224 conditions (e.g., filters, amplifies, and downconverts) the received RF signal, digitizes the conditioned signal, and provides samples. A demodulator 226 processes the samples as described below and provides demodulated data. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 234, respectively, at the transmitter 211.

Controllers/processors 214 and 230 direct operation at the transmitter 211 and receiver 213, respectively. Memories 216 and 236 store program codes in the form of computer software and data used by the transmitter 211 and receiver 213, respectively.

Figure 3:
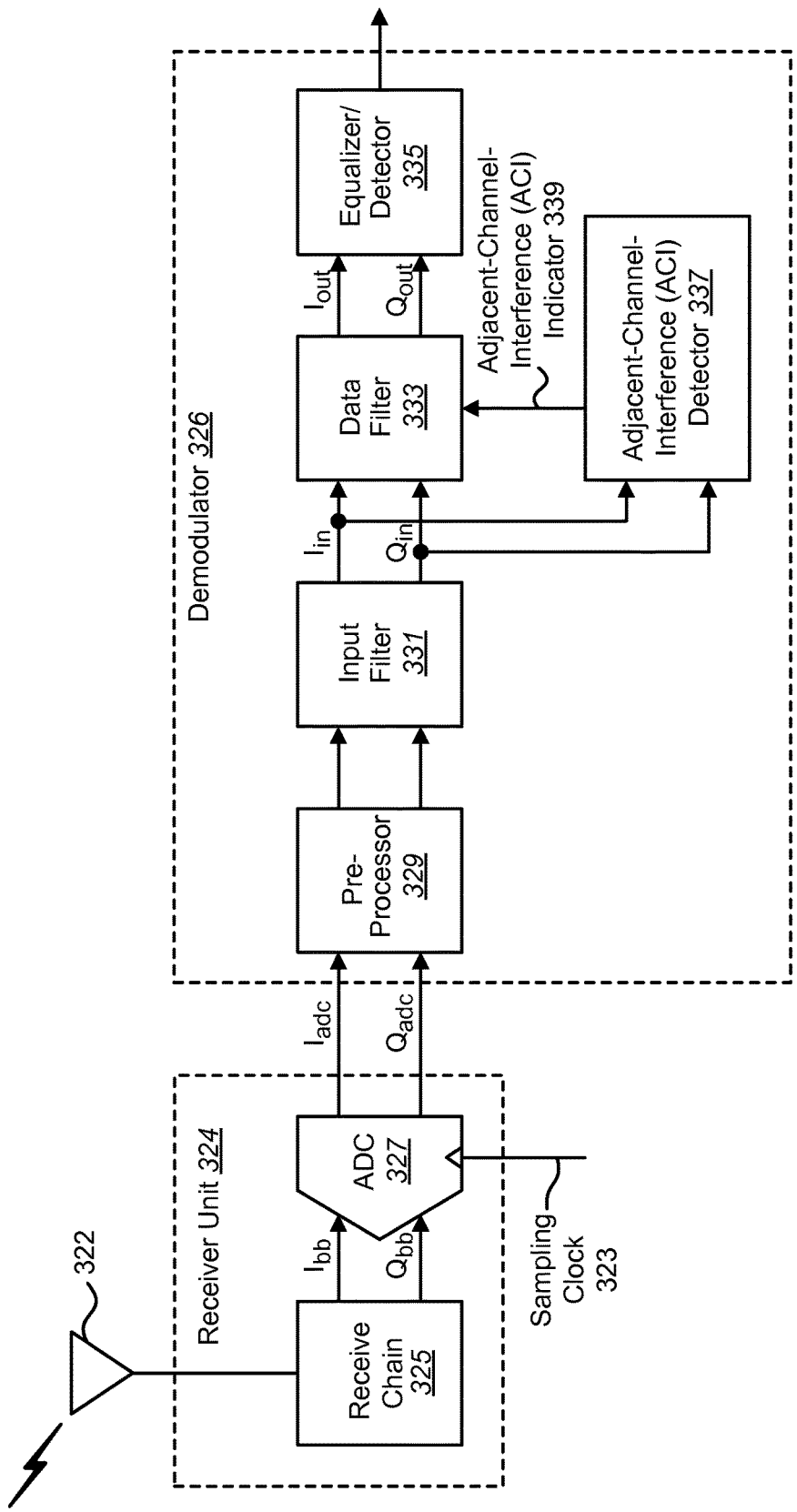
FIG. 3 shows a block diagram of a design of a receiver unit and demodulator at a receiver according to some embodiments of the present invention.

FIG. 3 shows a block diagram of a design of a receiver unit 324 and a demodulator 326 at a receiver 213 according to some embodiments of the present invention. Within the receiver unit 324, a receive chain 325 processes the received RF signal and provides I (inphase) and Q (quadrature) baseband signals, which are denoted as $I_{bb}$ and $Q_{bb}$. The receive chain 325 may perform low noise amplification, analog filtering, quadrature downconversion, etc. as desired or needed. An analog-to-digital converter (ADC) 327 digitalizes the I and Q baseband signals at a sampling rate of $f_{adc}$ from a sampling clock 323 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 329 performs pre-processing on the I and Q samples from the analog-to-digital converter (ADC) 327. For example, the pre-processor 329 may remove direct current (DC) offset, remove frequency offset, etc. An input filter 331 filters the samples from the pre-processor 329 based on a particular frequency response and provides input I and Q samples, which are denoted as $I_{in}$ and $Q_{in}$. The input filter 331 may filter the I and Q samples to suppress images resulting from the sampling by the analog-to-digital converter (ADC) 327 as well as jammers. The input filter 331 may also perform sample rate conversion, e.g., from 24× oversampling down to 2× oversampling. A data filter 333 filters the input I and Q samples from the input filter 331 based on another frequency response and provides output I and Q samples, which are denoted as $I_{out}$ and $Q_{out}$. The input filter 331 and the data filter 333 may be implemented with finite impulse response (FIR) filters, infinite impulse response (IIR) filters or filters of other types. The frequency responses of the input filter 331 and the data filter 333 may be selected to achieve good performance. In one design, the frequency response of the input filter 331 is fixed and the frequency response of the data filter 333 is configurable.

An adjacent-channel-interference (ACI) detector 337 receives the input I and Q samples from the input filter 331, detects for adjacent-channel-interference (ACI) in the received RF signal and provides an adjacent-channel-interference (ACI) indicator 339 to the data filter 333. The adjacent-channel-interference (ACI) indicator 339 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 339, to achieve desirable performance.

An equalizer/detector 335 receives the output I and Q samples from the data filter 333 and performs equalization, matched filtering, detection and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems.

In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 974-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
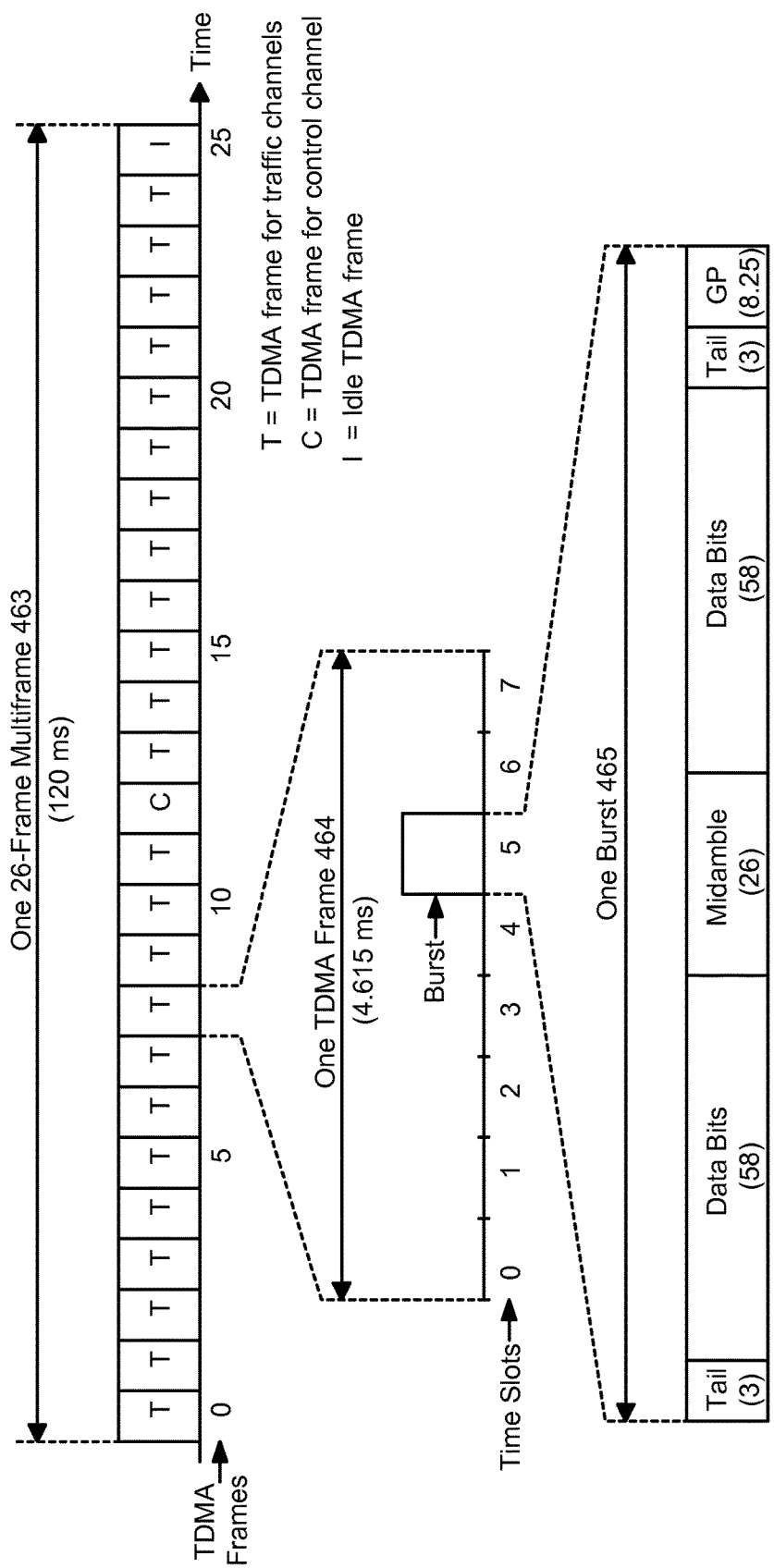
FIG. 4 shows example frame and burst formats in GSM according to some embodiments of the present invention.

FIG. 4 shows example frame and burst formats in GSM. The timeline for transmission is divided into multiframes 463 according to some embodiments of the present invention. For traffic channels used to transmit user-specific data, each multiframe 463 in this example includes 26 TDMA frames 464, which are labeled as TDMA frames 0 through 25. The traffic channels are sent in TDMA frames 0 through 11 and TDMA frames 13 through 24 of each multiframe 463. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 465 in GSM. Each burst 465 includes two tail fields, two data fields, a training sequence (or midamble) field and a guard period (GP). The number of symbols in each field is shown inside the parentheses. A burst 465 includes symbols for the tail, data and midamble fields. No symbols are sent in the guard period. TDMA frames of a particular carrier frequency are numbered and formed in groups of 26 or 51 TDMA frames 464 called multiframes 463.

Figure 5:
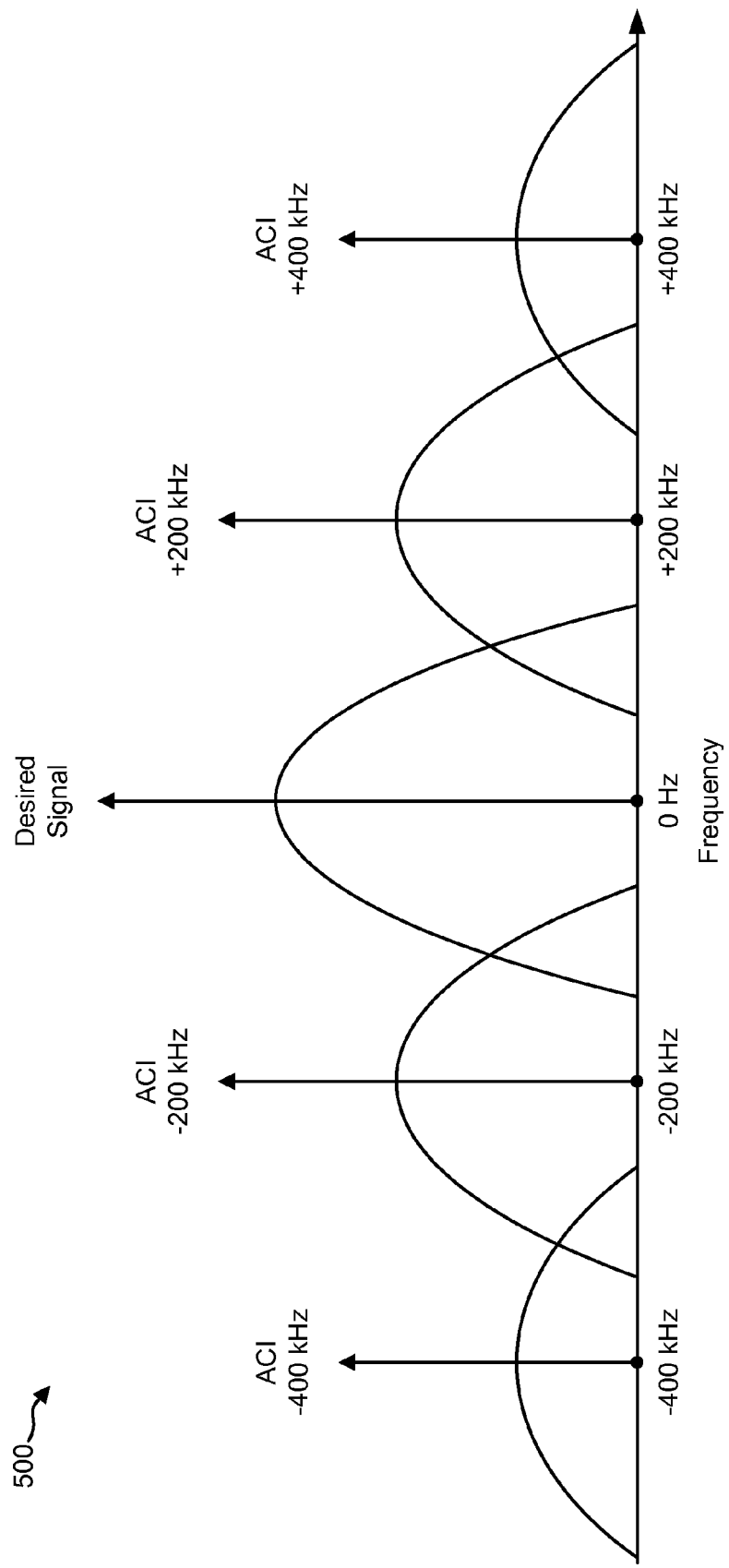
FIG. 5 shows an example spectrum in a GSM system according to some embodiments of the present invention.

FIG. 5 shows an example spectrum 500 in a GSM system according to some embodiments of the present invention. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers or non-adjacent RF channels) have center frequencies that are +400 kHz and −400 kHz from the center frequency of the desired RF channel. There may be other RF channels in the spectrum 500, which are not shown in FIG. 5 for simplicity. In GSM, an RF modulated signal is generated with a symbol rate of $f_{sym}$=13000/40=270.8 kilo symbols/second (ksps) and has a −3 decibel (dB) bandwidth of up to 135 kHz. The RF modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base Station 102 local oscillator (LO), using frequency offset estimation and correction. These bursts include a single tone, which corresponds to all "0" payload and training sequence. The all zero payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 may periodically wakeup to monitor the frequency burst to maintain its synchronization in standby mode. In the standby mode, the frequency offset is within ±2 kHz.

One or more modulation schemes are used in GERAN systems to communicate information such as voice, data and/or control information. Examples of the modulation schemes may include Gaussian Minimum Shift Keying (GMSK), M-ary Quadrature Amplitude Modulation (QAM) or M-ary PSK (Phase Shift Keying), where M=$2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with 3π/8 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical. The EGPRS2 standard uses GMSK, QPSK, 8-PSK, 16-QAM and 32-QAM modulations. The modulation type can be changed from burst to burst. Q-PSK, 8-PSK, 16-QAM and 32-QAM modulations in EGPRS2 are linear, 4-level, 8-level, 16-level and 32-level phase modulations with 3π/4, 3π/8, π/4, −π/4 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical. The symbol pulse of Q-PSK, 16-QAM and 32-QAM can use spectrally narrow or wide pulse shapes.

In GSM/EDGE, frequency bursts (FB) are sent regularly by the Base Station (BS) to allow Mobile Stations (MS) to synchronize their Local Oscillator (LO) to the Base Station LO, using frequency offset estimation and correction. These bursts comprise a single tone, which corresponds to all "0" payload and training sequence. The all zero payload of the frequency burst is a constant frequency signal, or a single tone burst. When in power mode, the remote terminal hunts continuously for a frequency burst from a list of carriers. Upon detecting a frequency burst, the MS will estimate the frequency offset relative to its nominal frequency, which is 67.7 KHz from the carrier. The MS LO will be corrected using this estimated frequency offset. In power up mode, the frequency offset can be as much as +/−19 KHz. The MS will periodically wakeup to monitor the frequency burst to maintain its synchronization in standby mode. In the standby mode, the frequency offset is within ±2 KHz.

Figure 6:
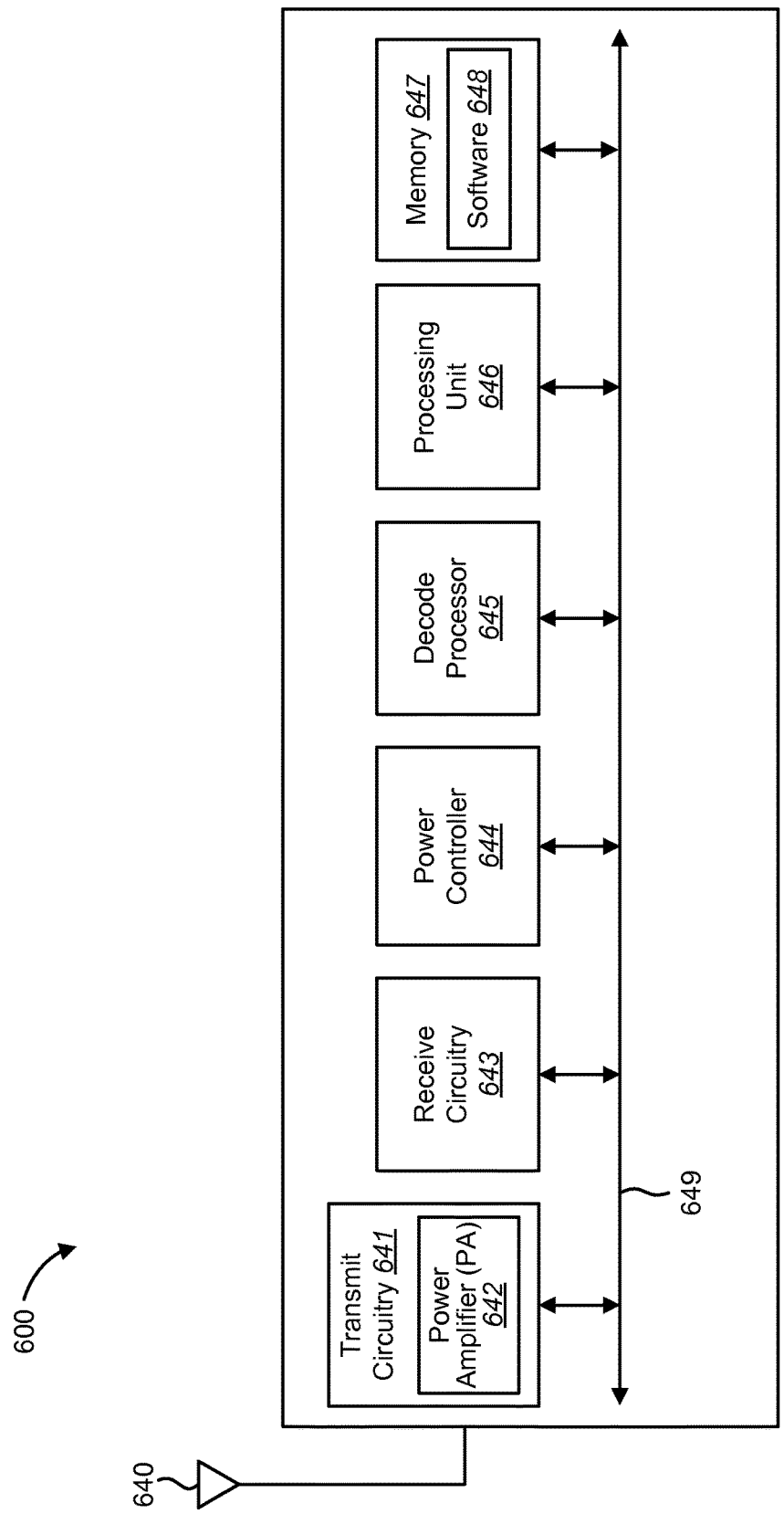
FIG. 6 illustrates an example of a wireless communication device according to some embodiments of the present invention in which the wireless communication device includes transmit circuitry (including a power amplifier (PA)), receive circuitry, power controller, decode processor, a processing unit for use in processing signals, and memory.

FIG. 6 illustrates an example of a wireless device 600 that includes transmit circuitry 641 (including a power amplifier (PA) 642), receive circuitry 643, a power controller 644, a decode processor 645, a processing unit 646 for use in processing signals and memory 647 according to some embodiments of the present invention. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649 which may include a power bus, a control signal bus, and a status signal bus in addition to a data bus. For the sake of clarity, the various busses are illustrated in FIG. 6 as the bus system 649.

Aspects of method embodiments (e.g., method actions or steps) may also be stored as instructions in the form of software or firmware located in memory 647 in a wireless device 600. These instructions may be executed by the controller/processor(s) of the wireless device 600. Alternatively, or in conjunction, the steps of the methods discussed may be stored as instructions in the form of software or firmware 648 located in memory 647 in the wireless device 600. These instructions may be executed by the processing unit 646 of the wireless device 600 in FIG. 6.

Figure 7:
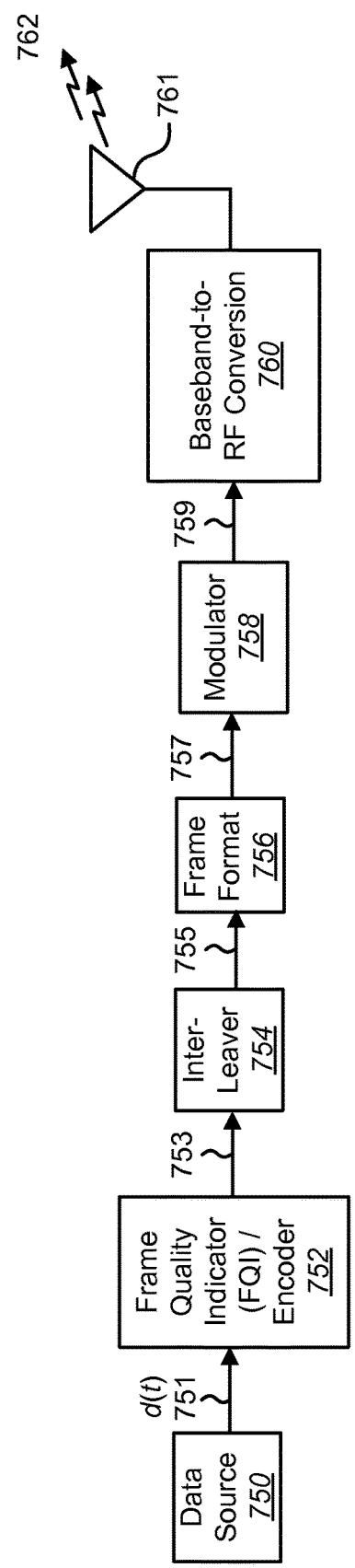
FIG. 7 illustrates an example of a transmitter structure and/or process according to some embodiments of the present invention, which may be implemented on a wireless device.

FIG. 7 illustrates an example of a transmitter structure and/or process according to some embodiments of the present invention. The transmitter structure and/or process of FIG. 7 may be implemented in a wireless device such as a wireless communication device 104 or a base station 102. The functions and components shown in FIG. 7 may be implemented by software, hardware or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code or any other dimension. A frame 757 may be composed of a fixed plurality of such sub-segments, each sub-segment including a portion of the total number of symbols allocated to the frame. In one example, the interleaved symbols 755 are segmented into a plurality S of sub-segments making up a frame 757.

A frame format block 756 may further specify the inclusion of, e.g., control symbols (not shown) along with the interleaved symbols 755. Such control symbols may include, e.g., power control symbols, frame format information symbols, etc.

A modulator 758 modulates the frame 757 to generate modulated data 759. Examples of modulation techniques include binary phase shift keying (BPSK) and quadrature phase shift keying (QPSK). The modulator 758 may also repeat a sequence of modulated data.

A baseband-to-radio-frequency (RF) conversion block 760 may convert the modulated data 759 to RF signals for transmission via an antenna 761 as signal 762 over a wireless communication link to one or more wireless device receivers.

Figure 8:
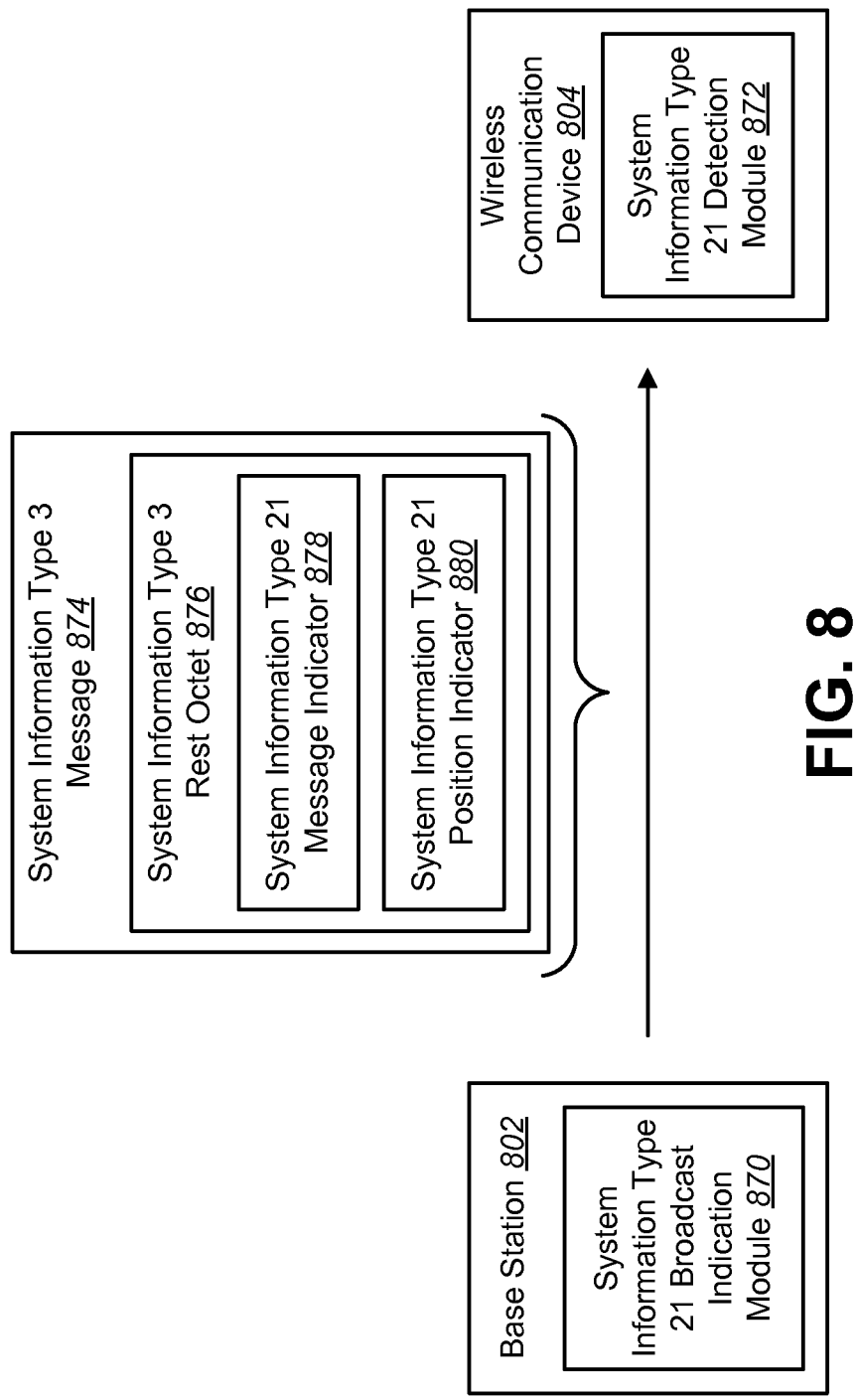
FIG. 8 is a block diagram illustrating the transmission of a System Information Type 3 message from a base station to a wireless communication device according to some embodiments of the present invention.

FIG. 8 is a block diagram illustrating the transmission of a System Information Type 3 message 874 from a base station 802 to a wireless communication device 804 according to some embodiments of the present invention. For example, the base station 802 may be the base station 102 and the wireless communication device 804 may be the wireless communication device 104 of FIG. 1. The System Information Type 3 message 874 may be used to inform the wireless communication device 804 of whether a System Information Type 21 message is broadcast in the cell where the wireless communication device 804 is located. A System Information Type 21 message may be transmitted by the base station 802 when barring indications, such as Extended Access Barring (EAB), is supported by the network. If the wireless communication device 804 is not configured for Extended Access Barring (EAB), the wireless communication device 804 may ignore the System Information Type 21 message. The System Information Type 21 message may provide a list of authorized access classes and the subcategory of wireless communication devices targeted by barring indications (e.g., Extended Access Barring (EAB)). Only the most recently received instance of the System Information Type 21 message is considered to be valid for the serving cell.

The contents of a System Information Type 21 message are listed in Table 1. In other words, Table 1 shows the structure of a System Information Type 21 message. The System Information Type 21 message may have an information element identifier (IEI), information element, type/reference (as described in 3GPP TS 44.018), presence, format and length.

TABLE 1

| IEI | Information Element | Type/Reference | Presence | Format | Length |
|---|---|---|---|---|---|
| | L2 Pseudo Length | L2 Pseudo Length/ 10.5.2.19 | M | V | 1 |
| | RR management Protocol Discriminator | Protocol Discriminator/10.2 | M | V | 1/2 |
| | Skip Indicator | Skip Indicator/ 10.3.1 | M | V | 1/2 |
| | System Information Type 21 Message Type | Message Type/10.4 | M | V | 1 |
| | SI 21 Rest Octets | SI 21 Rest Octets/ 10.5.2.37M | M | V | 20 |

The System Information Type 21 Rest Octets Information Element (IE) may include barring indications, such as Extended Access Barring (EAB) information. The System Information Type 21 Rest Octets Information Element (IE) may be a type 5 Information Element (IE) with a 20 octet length.

In the past, only base stations 802 and wireless communication devices 804 that support general packet radio service (GPRS) could use the System Information Type 21 message. Thus, if either the base station 802 or the wireless communication device 804 did not support general packet radio service (GPRS), the System Information Type 21 message could not be used to relay the barring indications (e.g., Extended Access Barring (EAB) information). In embodiments of the present invention, the general packet radio service (GPRS) compatibility of the base station 802 and the wireless communication device 804 is irrelevant to the use of the System Information Type 21 message.

The base station 802 may include a System Information Type 21 broadcast indication module 870. The System Information Type 21 broadcast indication module 870 may be used by the base station 802 to indicate to a wireless communication device 804 when the System Information Type 21 message is broadcast in the cell. The wireless communication device 804 needs to be informed of when the System Information Type 21 message is broadcast by the base station 802, otherwise the wireless communication device 804 may spend time looking for the message when it has not been sent, wasting time and energy resourced.

In one configuration, the base station 802 may use a first message (e.g., the System Information Type 3 message 874) to indicate to the wireless communication device 804 whether a second message (e.g., the System Information Type 21 message) is broadcast in the cell or not. The wireless communication device 804 is required to read System Information Type 3 messages 874. If the System Information Type 3 message 874 does not include the WHERE field (discussed in additional detail below in relation to FIG. 9 (the WHERE field is usually not present in the System Information Type 3 message 874)), the information concerning the System Information Type 21 message may be included in the System Information Type 3 message 874. The System Information Type 3 message 874 may include a System Information Type 3 Rest Octet 876. The System Information Type 3 Rest Octet 876 is an Information Element (IE) used in the System Information Type 3 message 874.

The System Information Type 3 Rest Octet 876 has a maximum space of 32 bits and one field is conditional in the Information Element (IE). If General Packet Radio Service (GPRS) Indicator is present in the System Information Type 3 Rest Octet 876, then Iu (Interface Unit) Indicator is not present. In this manner, it is possible with the current definition of Rest Octets to fit all the fields in 32 bits exactly.

If the WHERE field is not included in the System Information Type 3 message 874, in the worst case the System Information Type 3 Rest Octet 876 will use 29 bits and there is space for the System Information Type 3 Rest Octet 876 to include a System Information Type 21 message indicator 878. As there are three bits available, it is possible to use one bit for the System Information Type 21 message indicator 878 indicating that the System Information Type 21 message is broadcast in the cell and one bit to indicate whether the System Information Type 21 message is broadcast via broadcast control channel (BCCH) Norm or broadcast control channel (BCCH) Extended (using a System Information Type 21 position indicator 880). If the System Information Type 21 message indicator 878 indicates that the System Information Type 21 message is not broadcast, it is not necessary to include the System Information Type 21 position indicator 880 in the System Information Type 3 Rest Octet 876.

The details for the System Information Type 3 Rest Octet 876 Information Element (IE) are shown in Table 2 below. Table 2 illustrates the System Information Type 3 Rest Octet (SI3 Rest Octet) information element coded according to the syntax specified below and as described in 3GPP TS 44.018 Table 10.5.2.34.1.

TABLE 2

```
<SI3 Rest Octet> ::=
<Optional selection parameters>
<Optional Power offset>
<System Information 2ter Indicator>
<Early Classmark Sending Control>
<Scheduling if and where>
{ L | H <GPRS Indicator> }
<3G Early Classmark Sending Restriction>
{ L | H < SI2quater Indicator : < SI2quater Indicator struct > > }
```

TABLE 2-continued

```
<Iu Indicator>                       -- Conditional
<System Information 21 Indicator>    -- Conditional
<spare padding> ;
<Optional Selection Parameters> ::= L | H <Selection Parameters>;
<Selection Parameters> ::=
<CBQ: bit (1)>
<CELL_RESELECT_OFFSET: bit (6)>
<TEMPORARY_OFFSET: bit (3)>
<PENALTY_TIME: bit (5)>;
<Optional Power Offset> ::= L | H <Power Offset: bit (2)>;
<System Information 2ter Indicator> ::=     L | H;
<Early Classmark Sending Control> ::=   L | H;
<Scheduling if and where>::=L | H <WHERE: bit (3)>;
<GPRS Indicator> ::=
< RA COLOUR : bit (3) >
< SI13 POSITION : bit >;
<3G Early Classmark Sending Restriction>::=  L | H;
< SI2quater Indicator struct > ::=  < SI2quater_POSITION : bit > ;
<Iu Indicator> ::= <SI13alt POSITION: bit >;
<System Information 21 Indicator> ::=       L | H
                                            <SI21_POSITION :
                                            bit > ;;
```

The System Information Type 21 message indicator 878 and the System Information Type 21 position indicator 880 are described in more detail below in Table 3. Table 3 below illustrates the System Information Type 21 position indicator according to the syntax specified below and as described in 3GPP TS 44.018 Table 10.5.2.34.1.

TABLE 3

SYSTEM INFORMATION Type 21 Message Indicator (1 bit field)
This field is only present of WHERE information is not contained in SI 3 Rest Octets
L  SYSTEM INFORMATION TYPE 21 message is not available
H  SYSTEM INFORMATION TYPE 21 message is available
SYSTEM INFORMATION Type 21 Position Indicator SI21_POSITION (1 bit field)
0  SYSTEM INFORMATION TYPE 21 message is sent on BCCH Norm
1  SYSTEM INFORMATION TYPE 21 message is sent on BCCH Extended The wireless communication device 804 may include a System Information Type 21 detection module 872. The wireless communication device 804 may use the System Information Type 21 detection module 872 to determine whether a System Information Type 21 message has been broadcast by the base station 802 in the cell. For example, the wireless communication device 804 may use the System Information Type 21 detection module 872 to determine whether the System Information Type 21 message indicator 878 in a System Information Type 3 message 874 is set to high or low. If the System Information Type 21 message indicator 878 is set to high, the wireless communication device 804 may also use the System Information Type 21 detection module 872 to determine the System Information Type 21 position indicator 880 for the System Information Type 21 message.

Figure 9:
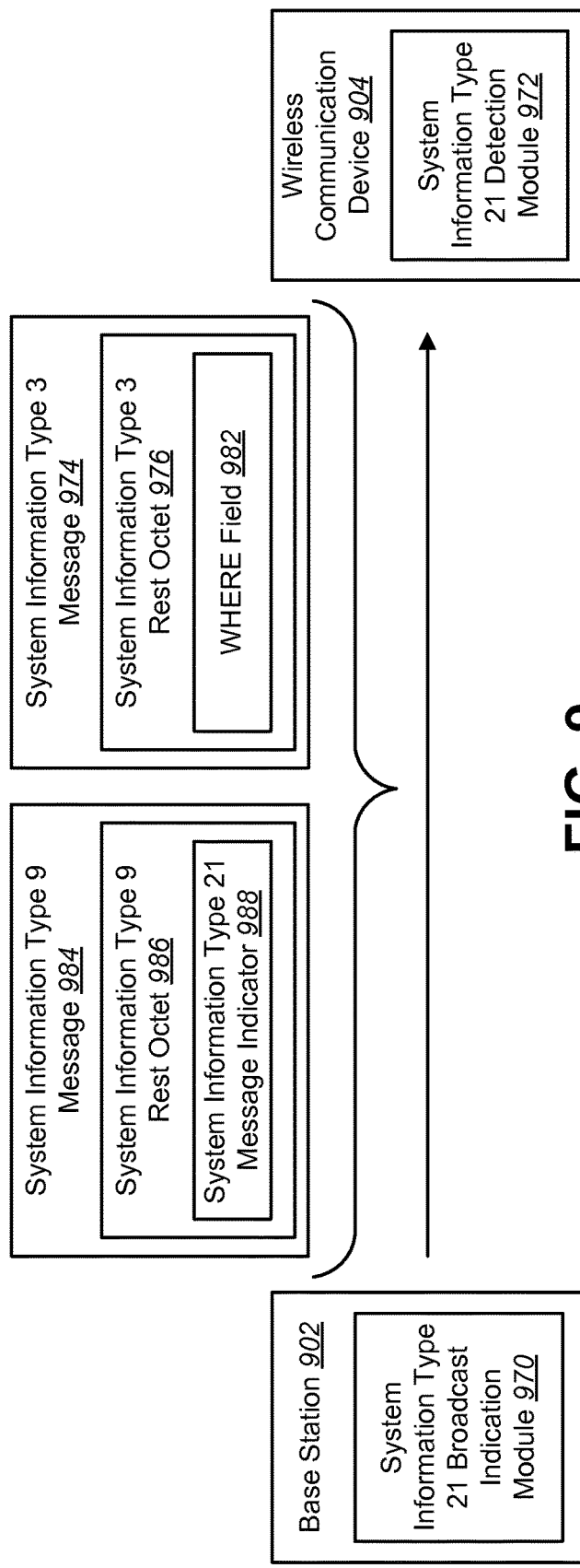
FIG. 9 is a block diagram illustrating the transmission of both a System Information Type 3 message and a System Information Type 9 message from a base station to a wireless communication device according to some embodiments of the present invention.

FIG. 9 is a block diagram illustrating the transmission of both a System Information Type 3 message 974 and a System Information Type 9 message 984 from a base station 902 to a wireless communication device 904 according to some embodiments of the present invention. For example, the base station 902 may be the base station 102 and the wireless communication device 904 may be the wireless communication device 104 of FIG. 1. As discussed above, the wireless communication device 904 may be required to read the System Information Type 3 message 974. However, the wireless communication device 904 may not be required to read the System Information Type 9 message 984. If there is not enough space in the System Information Type 3 message 974 to include a System Information Type 21 message indicator 978, the System Information Type 21 message indicator 988 may instead be included in the System Information Type 9 message 984.

The base station 902 may include a System Information Type 21 broadcast indication module 970. The System Information Type 21 broadcast indication module 970 may be used by the base station 902 to indicate to a wireless communication device 904 when the System Information Type 21 message is broadcast in the cell. As discussed above, the wireless communication device 904 needs to be informed of when the System Information Type 21 message is broadcast by the base station 902, otherwise the wireless communication device 904 may waste time and energy looking for the message when it has not been sent.

When the wireless communication device 904 reads the System Information Type 3 message 974, the wireless communication device 904 may first check whether the System Information Type 3 Rest Octet 976 on the System Information Type 3 message 974 includes the WHERE field 982. If the System Information Type 3 Rest Octet 976 includes the WHERE field 982, the wireless communication device 904 may know that a System Information Type 9 message 984 has been broadcast by the base station 902 with the System Information Type 21 message indicator 988. Thus, the wireless communication device 904 may be directed by the System Information Type 3 message 974 to read the System Information Type 9 message 984.

The System Information Type 9 message 984 may include a System Information Type 9 Rest Octet 986. The System Information Type 9 Rest Octet 986 is an Information Element (IE) used in System Information Type 9 messages 984. The System Information Type 9 Rest Octet 986 may include a System Information Type 21 message indicator 988. The details for the System Information Type 9 Rest Octet 986 Information Element (IE) are shown in Table 4. Table 4 below illustrates the System Information Type 9 Rest Octets according to the syntax specified below and as described in 3GPP TS 44.018 Table 10.5.2.37a.2.

TABLE 4

Attributes
The scheduling info indicates one or more information types (in info type) together with their positions. Here, a position specifies at which relative position P (specified in relative_position) modulo a position modulus M (specified in modulus) messages of the given information type are sent, on the BCCH norm or BCCH ext (see 3GPP TS 45.002) as indicated in bcch_type.
Precisely, messages of the given information type are sent in the multiframes for which ((frame number) DIV 51) mod (M)) = P.
If the position modulus M equals 0, the information type is not sent.
Info_type_4 (4 bits)
This field contains a binary encoded non-negative integer number assigned to a type of information sent on the BCCH. All values indicate unknown, unnecessary information and are reserved for future use.
Info_type_5 (5 bits)
This field contains a binary encoded non-negative integer number assigned to a type of information sent on the BCCH. All values except those defined below indicate unknown, unnecessary information and are reserved for future use.
Info_type_5:
Bit
5 4 3 2 1
0 0 0 0 0        System Information type 1
0 0 0 0 1        System Information type 2
0 0 0 1 0        System Information type 2bis
0 0 0 1 1        System Information type 2ter
0 0 1 0 0        System Information type 3
0 0 1 0 1        System Information type 4
0 0 1 1 0        System Information type 7
0 0 1 1 1        System Information type 8
0 1 0 0 0        System Information type 9
0 1 0 0 1        System Information type 13
0 1 0 1 1        System Information type 16
0 1 1 0 0        System Information type 17
0 1 1 0 1        System Information type 18
0 1 1 1 0        System Information type 19
0 1 1 1 1        System Information type 20
1 0 0 0 0        System Information type 21
Info_type_6 (6 bits)
This field contains a binary encoded non-negative integer number assigned to a type of information sent on the BCCH. All values indicate unknown, unnecessary information and are reserved for future use.
modulus (4 bits)
This field encodes the position modulus, according to the following encoding method. Let N be the integer encoded in binary in the modulus field; the position modulus is then defined as follows:
    If N=0, the position modulus is 0,
    if N>0, the position modulus is $2^{N+1}$.
relative position (0 bits if the non-negative integer n contained in the modulus field is 0; n+1 bits, if the non-negative integer n encoded in the modulus field is > 0)
This field contains the N+1 bit binary encoding of a non-negative integer number < $2^{N+1}$.
bcch_type (1 bit)
0    BCCH Norm (as defined in 3GPP TS 45.002)
1    BCCH Ext (as defined in 3GPP TS 45.002)

The wireless communication device 904 may include a System Information Type 21 detection module 972. The System Information Type 21 detection module 972 may determine whether a System Information Type 21 message has been broadcast by the base station 902 in the cell. For example, the System Information Type 21 detection module 972 may determine whether the System Information Type 21 message indicator 988 in a System Information Type 9 message 984 is set to high or low.

Figure 10:
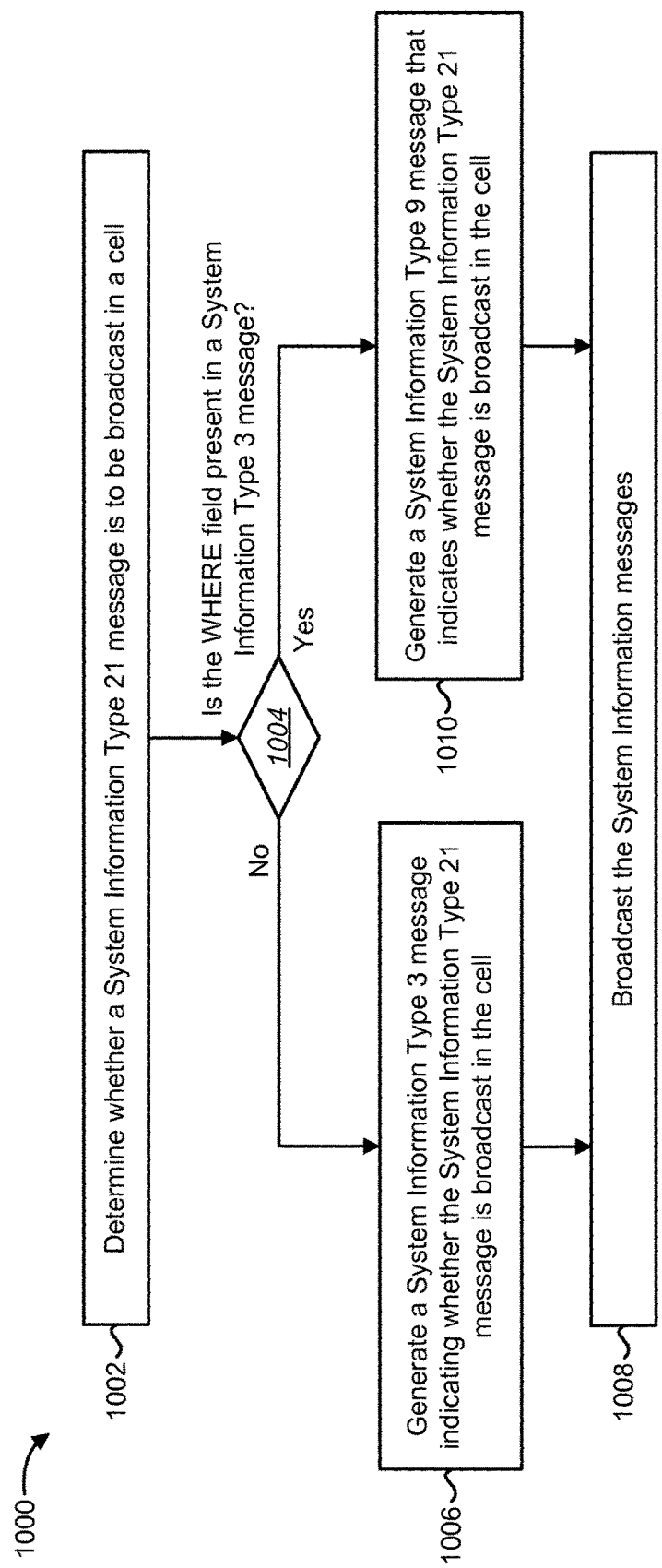
FIG. 10 is a flow diagram of a method for informing a wireless communication device whether a System Information Type 21 message is broadcast according to some embodiments of the present invention.

FIG. 10 is a flow diagram of a method 1000 for informing a wireless communication device 804 whether a System Information Type 21 message is broadcast according to some embodiments of the present invention. The method 1000 may be performed by a base station 802. In one configuration, the method 1000 may be performed by the System Information Type 21 broadcast indication module 870 located at the base station 802. The base station 802 may determine 1002 whether a System Information Type 21 message is to be broadcast in a cell. The base station 802 may then determine 1004 whether the WHERE field 982 is present in a System Information Type 3 message 874, 974.

If the WHERE field 982 is present in the System Information Type 3 message 974, the base station 802 may generate 1010 a System Information Type 9 message 984 that indicates whether the System Information Type 21 is broadcast in the cell. This may be because there is insufficient space in the System Information Type 3 message 974 to include a System Information Type 21 message indicator 878. However, the inclusion of the WHERE field 982 in a System Information Type 3 message 974 indicates to a wireless communication device 804 that the System Information Type 9 message 984 needs to be read. The base station 802 may then broadcast 1008 the System Information messages.

If the WHERE field 982 is not present in the System Information Type 3 message 874, the System Information Type 3 message 874 may have sufficient space to include a System Information Type 21 message indicator 878. The base station 802 may generate 1006 a System Information Type 3 message 874 indicating whether the System Information Type 21 message is broadcast in the cell. The base station 802 may then broadcast 1008 the System Information messages.

Figure 11:
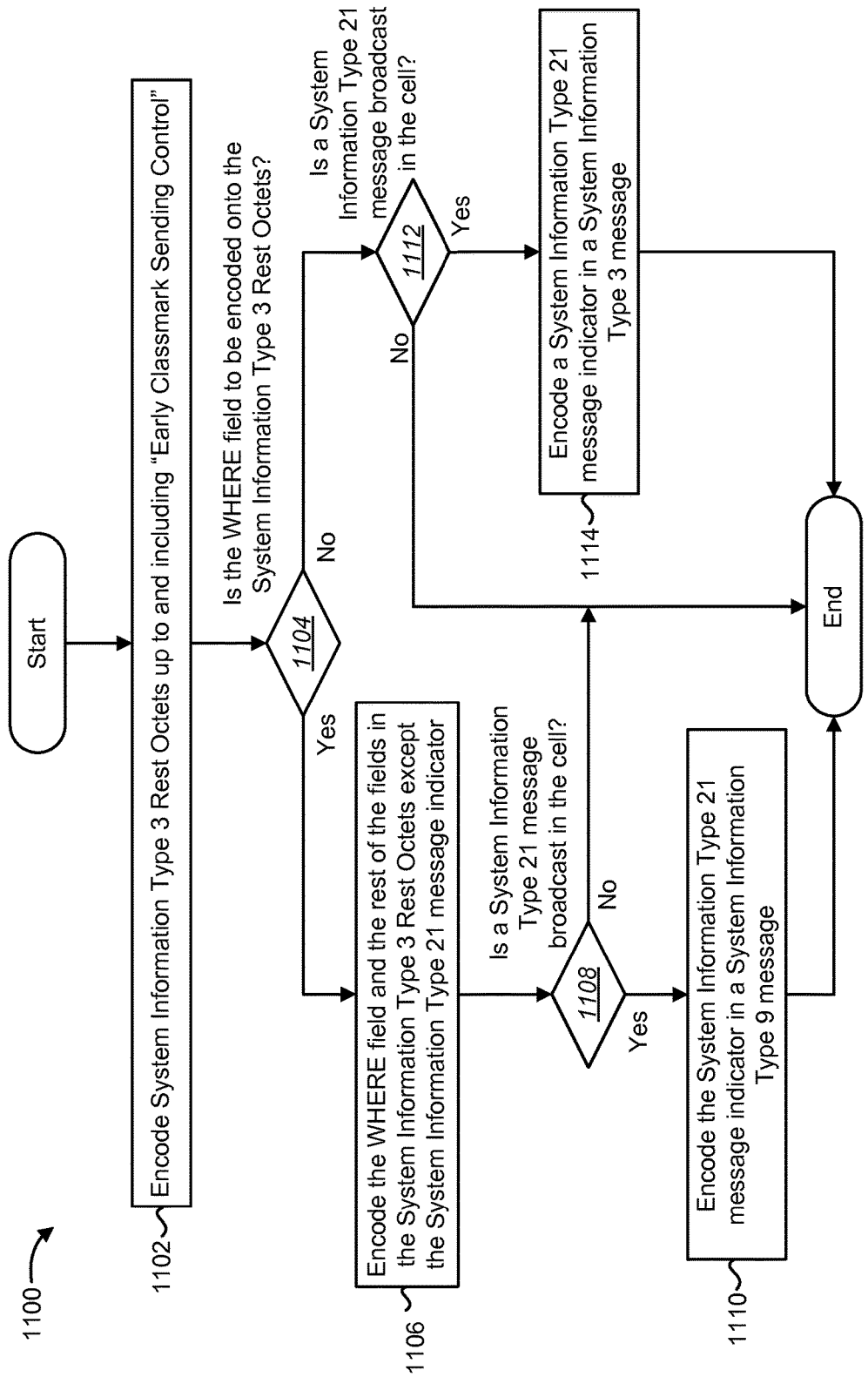
FIG. 11 is another flow diagram of a method for informing a wireless communication device whether a System Information Type 21 message is broadcast in a cell according to some embodiments of the present invention.

FIG. 11 is another flow diagram of a method 1100 for informing a wireless communication device 804 whether a System Information Type 21 message is broadcast in a cell according to some embodiments of the present invention. The method 1100 may be performed by a base station 802. In one configuration, the method 1100 may be performed by the System Information Type 21 broadcast indication module 870 located at the base station 802. The method 1100 may start. The base station 802 may encode 1102 System Information Type 3 Rest Octets 876 up to and including "Early Classmark Sending Control." The base station 802 may then determine 1104 if the WHERE field 982 is to be encoded into the System Information Type 3 Rest Octets 876.

If the WHERE field 982 is not to be encoded into the System Information Type 3 Rest Octets 876, the base station 802 may determine 1112 whether a System Information Type 21 message is broadcast in the cell. If a System Information Type 21 message is broadcast in the cell, the base station 802 may encode 1114 the System Information Type 21 message indicator 988 in a System Information Type 3 message 874. The method 1100 may then end. If the System Information Type 21 message is not broadcast in the cell, the method 1100 may end.

If the WHERE field 982 is to be encoded into the System Information Type 3 Rest Octets 976, the base station 802 may encode 1106 the WHERE field 982 and the rest of the fields in the System Information Type 3 Rest Octets 976 except for the System Information Type 21 message indicator 878. The base station 802 may then determine 1108 whether a System Information Type 21 message is broadcast in the cell. If a System Information Type 21 message is not broadcast in the cell, the method 1100 ends and may be repeated as desired or necessary. If a System Information Type 21 message is broadcast in the cell, the base station 802 may encode 1110 the System Information Type 21 message indicator 988 in a System Information Type 9 message 984. The method 1100 may then end. If the System Information Type 21 message is not broadcast in the cell, the method 1100 may end.

Figure 12:
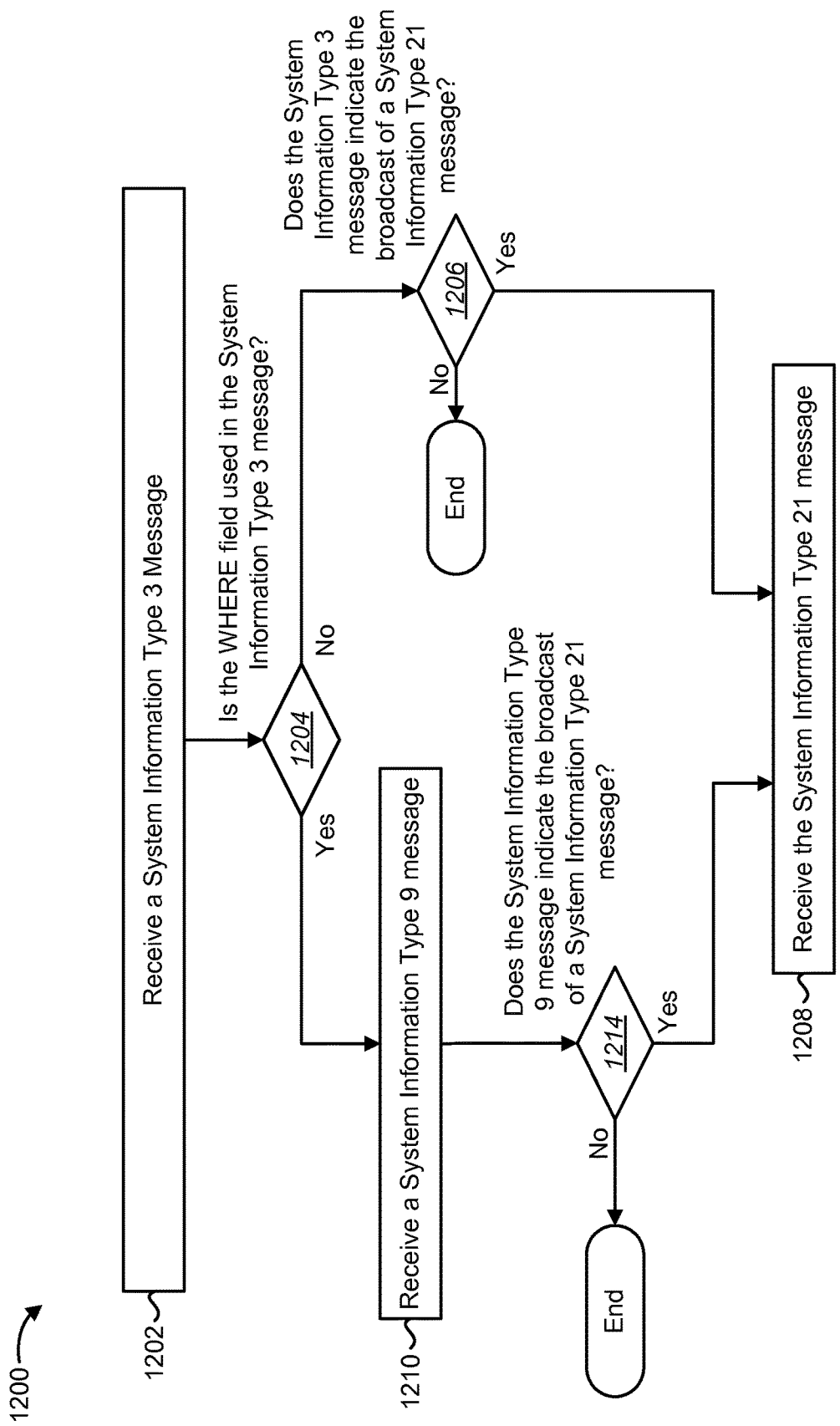
FIG. 12 is a flow diagram of a method for determining whether a System Information Type 21 message has been broadcast in a cell according to some embodiments of the present invention.

FIG. 12 is a flow diagram of a method 1200 for determining whether a System Information Type 21 message has been broadcast in a cell according to some embodiments of the present invention. The method 1200 may be performed by a wireless communication device 804. In one configuration, the method 1200 may be performed by a System Information Type 21 detection module 872 on the wireless communication device 804. The wireless communication device 804 may receive 1202 a System Information Type 3 message 874. The wireless communication device 804 may determine 1204 whether the WHERE field 982 is used in the System Information Type 3 message 874.

If the WHERE field 982 is not used in the System Information Type 3 message 874, the wireless communication device 804 may determine 1206 whether the System Information Type 3 message 874 indicates the broadcast of a System Information Type 21 message in the cell. If the System Information Type 3 message 874 indicates the broadcast of a System Information Type 21 message in the cell, the wireless communication device 804 may receive 1208 the System Information Type 21 message. If the System Information Type 3 message 874 does not indicate the broadcast of a System Information Type 21 message in the cell, the method 1200 may end. In other words, because a System Information Type 21 message has not been broadcast in the cell, the wireless communication device 804 does not need to search for the System Information Type 21 message.

If the WHERE field 982 is used in the System Information Type 3 message 974, the wireless communication device 804 knows that a System Information Type 9 message 984 has been broadcast by the base station 802 in the cell. The wireless communication device 804 may receive 1210 the System Information Type 9 message 984. The wireless communication device 804 may then determine 1214 whether the System Information Type 9 message 984 indicates the broadcast of a System Information Type 21 message in the cell. If the System Information Type 9 message 984 indicates the broadcast of a System Information Type 21 message in the cell, the wireless communication device 804 may receive 1208 the System Information Type 21 message. If the System Information Type 9 message 984 does not indicate the broadcast of a System Information Type 21 message in the cell, the method 1200 may end.

Figure 13:
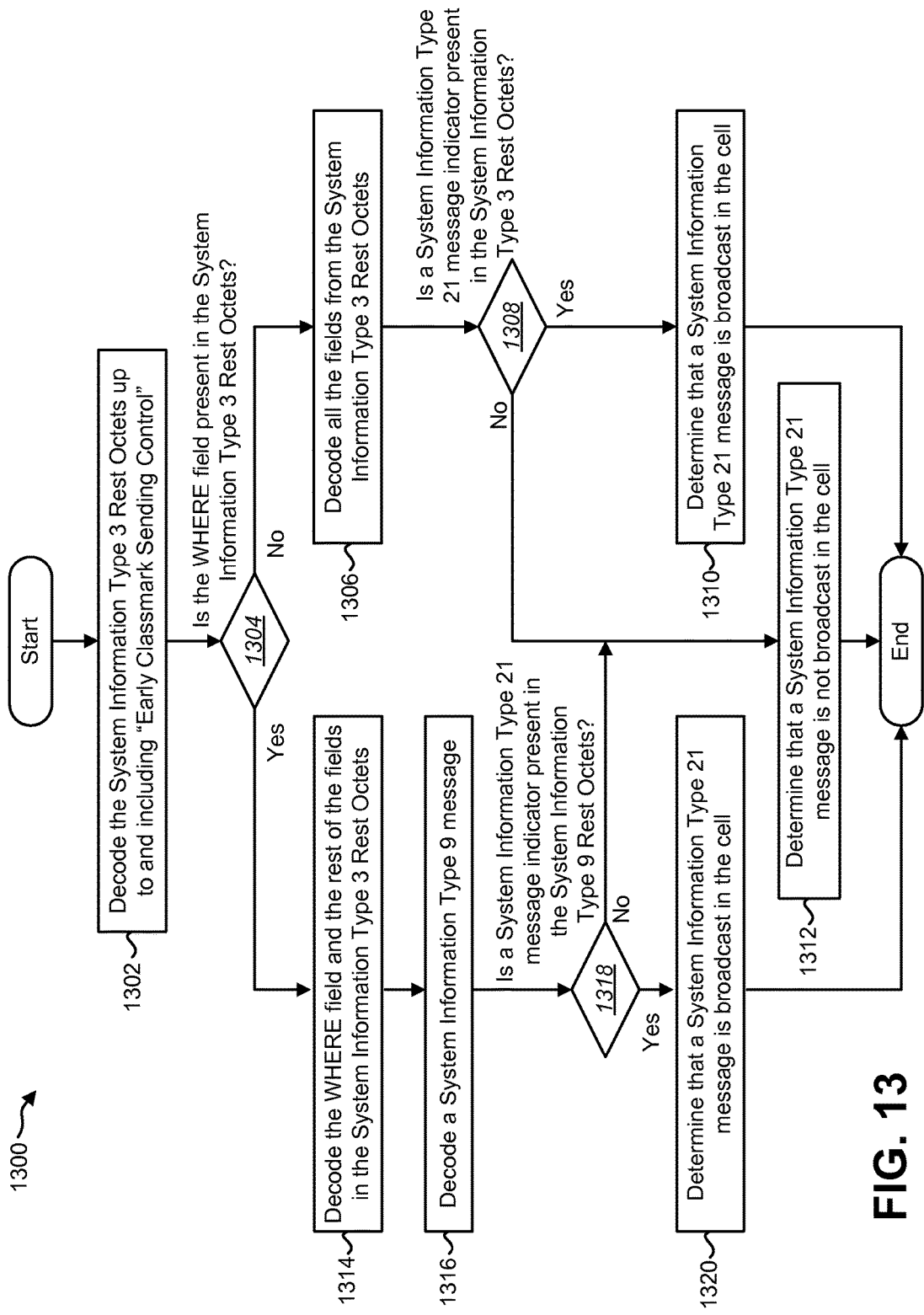
FIG. 13 is a flow diagram of another method for determining whether a System Information Type 21 message has been broadcast in a cell according to some embodiments of the present invention.

FIG. 13 is a flow diagram of another method 1300 for determining whether a System Information Type 21 message has been broadcast in a cell according to some embodiments of the present invention. The method 1300 may be performed by a wireless communication device 804. In one configuration, the method 1300 may be performed by a System Information Type 21 detection module 872 on the wireless communication device 804. The method 1300 may start. The wireless communication device 804 may decode 1302 the System Information Type 3 Rest Octets 876 up to and including "Early Classmark Sending Control." The wireless communication device 804 may then determine 1304 whether the WHERE field 982 is present in the System Information Type 3 Rest Octets 876.

If the WHERE field 982 is not present in the System Information Type 3 Rest Octets 876, the wireless communication device 104 may decode 1306 all the fields from the System Information Type 3 Rest Octets 876. The wireless communication device 804 may then determine 1308 whether a System Information Type 21 message indicator 878 is present in the System Information Type 3 Rest Octets 876. If a System Information Type 21 message indicator 878 is present in the System Information Type 3 Rest Octets 876, the wireless communication device 804 may determine 1310 that a System Information Type 21 message is broadcast in the cell. The method 1300 may then end. If a System Information Type 21 message indicator 878 is not present in the System Information Type 3 Rest Octets 876, the wireless communication device 804 may determine 1312 that a System Information Type 21 message is not broadcast in the cell and the method 1300 may end.

If the WHERE field 982 is present in the System Information Type 3 Rest Octets 976, the wireless communication device 804 may decode 1314 the WHERE field 982 along with the rest of the fields in the System Information Type 3 Rest Octets 976. The wireless communication device 804 may then decode 1316 a System Information Type 9 message 984. The wireless communication device 804 may determine 1318 whether a System Information Type 21 message indicator 988 is present in the System Information Type 9 Rest Octets 986. If a System Information Type 21 message indicator 988 is not present in the System Information Type 9 Rest Octets 986, the wireless communication device 804 may determine 1312 that a System Information Type 21 message is not broadcast in the cell. Then, the method 1300 may end. If a System Information Type 21 message indicator 988 is present in the System Information Type 9 Rest Octets 986, the wireless communication device 804 may determine 1320 that a System Information Type 21 message is broadcast in the cell. Then, the method 1300 may end.

Figure 14:
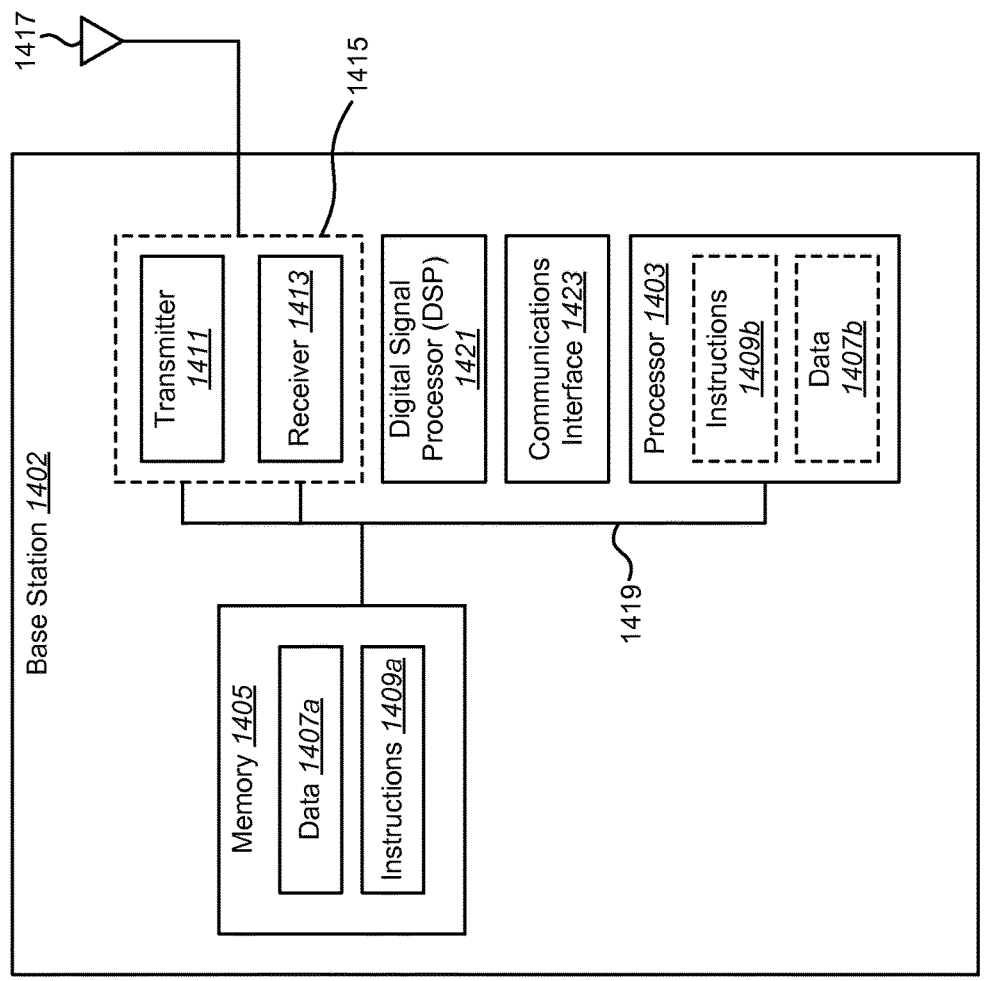
FIG. 14 illustrates certain components that may be included within a base station according to some embodiments of the present invention.

FIG. 14 illustrates certain components that may be included within a base station 1402 according to some embodiments of the present invention. A base station 1402 may also be referred to as, and may include some or all of the functionality of, an access point, a broadcast transmitter, a NodeB, an evolved NodeB, etc. For example, the base station 1402 may be the base station 102 of FIG. 1.

The base station 1402 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the base station 1402 of FIG. 14, in an alternative configuration, a combination of processors (e.g., an ARM and DSP) could be used.

The base station 1402 also includes memory 1405. The memory 1405 may be any electronic component capable of storing electronic information. The memory 1405 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1407a and instructions 1409a may be stored in the memory 1405. The instructions 1409a may be executable by the processor 1403 to implement the methods disclosed herein. Executing the instructions 1409a may involve the use of the data 1407a that is stored in the memory 1405. When the processor 1403 executes the instructions 1409a, various portions of the instructions 1409b may be loaded onto the processor 1403, and various pieces of data 1407b may be loaded onto the processor 1403.

The base station 1402 may also include a transmitter 1411 and a receiver 1413 to allow transmission and reception of signals to and from the base station 1402. The transmitter 1411 and receiver 1413 may be collectively referred to as a transceiver 1415. An antenna 1417 may be electrically coupled to the transceiver 1415. The base station 1402 may also include (not shown) multiple transmitters, multiple receivers, multiple transceivers and/or additional antennas.

The base station 1402 may include a digital signal processor (DSP) 1421. The base station 1402 may also include a communications interface 1423. The communications interface 1423 may allow a user to interact with the base station 1402.

The various components of the base station 1402 may be coupled together by one or more buses, which may include a power bus, a control signal bus, a status signal bus, a data bus, etc. For the sake of clarity, the various buses are illustrated in FIG. 14 as a bus system 1419.

Figure 15:
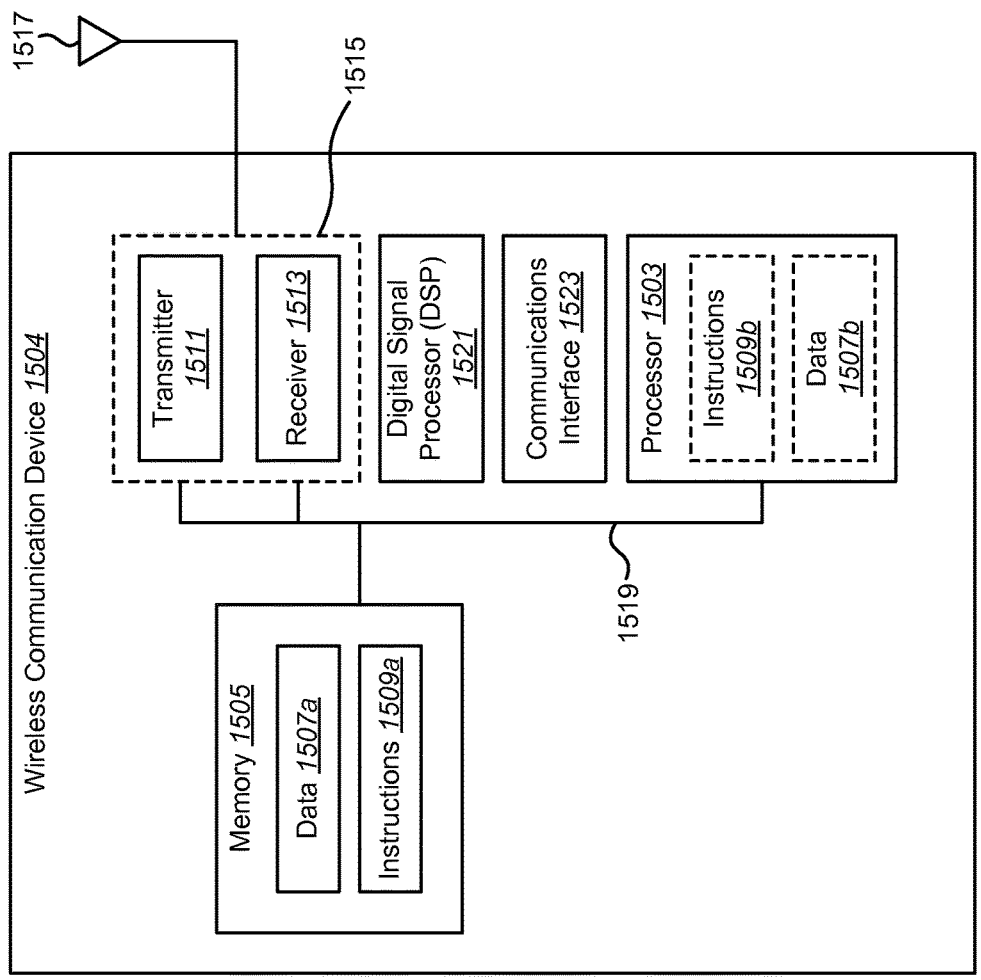
FIG. 15 illustrates certain components that may be included within a wireless communication device according to some embodiments of the present invention.

FIG. 15 illustrates certain components that may be included within a wireless communication device 1504 according to some embodiments of the present invention. The wireless communication device 1504 may be an access terminal, a mobile station, a user equipment (UE), etc. The wireless communication device 1504 includes a processor 1503. For example the wireless communication device 1504 may be the wireless communication device 104 of FIG. 1.

The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the wireless communication device 1504 of FIG. 15, in an alternative configuration, a combination of processors (e.g., an ARM and DSP) could be used.

The wireless communication device 1504 also includes memory 1505. The memory 1505 may be any electronic component capable of storing electronic information. The memory 1505 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1507a and instructions 1509a may be stored in the memory 1505. The instructions 1509a may be executable by the processor 1503 to implement the methods disclosed herein. Executing the instructions 1509a may involve the use of the data 1507a that is stored in the memory 1505. When the processor 1503 executes the instructions 1509, various portions of the instructions 1509b may be loaded onto the processor 1503, and various pieces of data 1507b may be loaded onto the processor 1503.

The wireless communication device 1504 may also include a transmitter 1511 and a receiver 1513 to allow transmission and reception of signals to and from the wireless communication device 1504 via an antenna 1517. The transmitter 1511 and receiver 1513 may be collectively referred to as a transceiver 1515. The wireless communication device 1504 may also include (not shown) multiple transmitters, multiple antennas, multiple receivers and/or multiple transceivers.

The wireless communication device 1504 may include a digital signal processor (DSP) 1521. The wireless communication device 1504 may also include a communications interface 1523. The communications interface 1523 may allow a user to interact with the wireless communication device 1504.

The various components of the wireless communication device 1504 may be coupled together by one or more buses, which may include a power bus, a control signal bus, a status signal bus, a data bus, etc. For the sake of clarity, the various buses are illustrated in FIG. 15 as a bus system 1519.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 10-13 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for signaling a broadcast of a message, the method comprising:
    determining that a first message is to be broadcast in a cell, wherein the first message includes a list of authorized access classes and a subcategory of wireless communication devices targeted by barring indications;
    generating a second message that is a System Information Type 3 message, the second message comprises an indication that the first message is to be broadcast, wherein the indication comprises a System Information Type 21 indicator when a WHERE field is not included in the System Information Type 3 message, and wherein the indication indicates a System Information Type 9 message has been broadcast when the WHERE field is included in the System Information Type 3 message; and
    broadcasting the second message to general packet radio service (GPRS) and non-GPRS wireless communication devices.

2. The method of claim 1, wherein the indication is in System Information Type 3 Rest Octets in the System Information Type 3 message.

3. The method of claim 2, wherein the first message is a System Information Type 21 message.

4. The method of claim 3, wherein the System Information Type 3 message does not comprise a WHERE field.

5. The method of claim 3, wherein the System Information Type 3 message further comprises a System Information Type 21 position indicator.

6. The method of claim 5, wherein the System Information Type 21 position indicator is set to BCCH Norm.

7. The method of claim 5, wherein the System Information Type 21 position indicator is set to BCCH Extended.

8. The method of claim 1, wherein the System Information Type 3 message comprises a WHERE field.

9. The method of claim 8, further comprising:
    generating a System Information Type 9 message; and
    broadcasting the System Information Type 9 message.

10. The method of claim 9, wherein the System Information Type 9 comprises an indication in System Information Type 9 Rest Octets that indicates that the first message is to be broadcast.

11. The method of claim 1, wherein the method is performed by a base station.

12. The method of claim 1, wherein the barring indications comprises Extended Access Barring information.

13. An apparatus for signaling a broadcast of a first message, comprising:
    a processor;
    memory in electronic communication with the processor;
    instructions stored in the memory, the instructions being executable by the processor to:
    determine that a first message is to be broadcast in a cell, wherein the first message includes a list of authorized access classes and a subcategory of wireless communication devices targeted by barring indications;
    generate a second message that is a System Information Type 3 message, the second message comprises an indication that the first message is to be broadcast, wherein the indication comprises a System Information Type 21 indicator when a WHERE field is not included in the System Information Type 3 message, and wherein the indication indicates a System Information Type 9 message has been broadcast when the WHERE field is included in the System Information Type 3 message; and
    broadcast the second message to general packet radio service (GPRS) and non-GPRS wireless communication devices.

14. The apparatus of claim 13, wherein the indication is in System Information Type 3 Rest Octets in the System Information Type 3 message.

15. The apparatus of claim 14, wherein the first message is a System Information Type 21 message.

16. The apparatus of claim 15, wherein the System Information Type 3 message does not comprise a WHERE field.

17. The apparatus of claim 15, wherein the System Information Type 3 message further comprises a System Information Type 21 position indicator.

18. The apparatus of claim 17, wherein the System Information Type 21 position indicator is set to BCCH Norm.

19. The apparatus of claim 17, wherein the System Information Type 21 position indicator is set to BCCH Extended.

20. The apparatus of claim 13, wherein the instructions are further executable to:
    generate a third message, wherein the third message indicates that the second message has been broadcast; and
    broadcast the third message.

21. The apparatus of claim 20, wherein the second message is a System Information Type 9 message, wherein the third message is a System Information Type 3 message, and wherein the System Information Type 3 message comprises a WHERE field.

22. The apparatus of claim 21, wherein the indication is in System Information Type 9 Rest Octets in the System Information Type 9 message.

23. The apparatus of claim 13, wherein the apparatus is a base station.

24. The apparatus of claim 13, wherein the barring indications comprises Extended Access Barring information.

25. A method for detecting a broadcast of a first message, the method comprising:
    receiving a second message that is a System Information Type 3 message at one or more of a general packet radio service (GPRS) and a non-GPRS wireless communication device, wherein the System Information Type 3 message comprises a System Information Type 21 indicator when a WHERE field is not included in the System Information Type 3 message, and wherein the System Information Type 3 message indicates a System Information Type 9 message has been broadcast when the WHERE field is included in the System Information Type 3 message;
decoding the second message; and
using the second message to determine whether a first message has been broadcast, wherein the first message includes a list of authorized access classes and a subcategory of wireless communication devices targeted by barring indications.

26. The method of claim 25, wherein the first message is a System Information Type 21 message.

27. The method of claim 26, wherein using the second message to determine whether a System Information Type 21 message has been broadcast comprises:
determining that the second message comprises a WHERE field;
decoding all fields from System Information Type 3 Rest Octets in the System Information Type 3 message; and
determining whether the System Information Type 3 Rest Octets comprise a System Information Type 21 message indicator.

28. The method of claim 27, wherein the System Information Type 3 Rest Octets does not comprise a System Information Type 21 message indicator, and wherein using the second message to determine whether a System Information Type 21 message has been broadcast further comprises determining that a System Information Type 21 message is not broadcast in a cell.

29. The method of claim 27, wherein the System Information Type 3 Rest Octets comprise a System Information Type 21 message indicator, and wherein using the second message to determine whether a System Information Type 21 message has been broadcast further comprises determining that a System Information Type 21 message is broadcast in a cell.

30. The method of claim 29, wherein the System Information Type 3 message further comprises a System Information Type 21 position indicator.

31. The method of claim 30, wherein the System Information Type 21 position indicator is set to BCCH Norm.

32. The method of claim 30, wherein the System Information Type 21 position indicator is set to BCCH Extended.

33. The method of claim 26, further comprising receiving a third message, wherein the third message indicates that the second message has been broadcast.

34. The method of claim 33, further comprising determining that the third message does not comprise a WHERE field, wherein the second message is a System Information Type 9 message, and wherein the third message is a System Information Type 3 message.

35. The method of claim 34, wherein the System Information Type 9 message does not comprise a System Information Type 21 message indicator, and wherein using the second message to determine whether a System Information Type 21 message has been broadcast further comprises determining that a System Information Type 21 message is not broadcast in a cell.

36. The method of claim 34, wherein the System Information Type message comprises a System Information Type 21 message indicator, and wherein using the second message to determine whether a System Information Type 21 message has been broadcast further comprises determining that a System Information Type 21 message is broadcast in a cell.

37. The method of claim 25, wherein the barring indications comprises Extended Access Barring information.

38. A wireless communication device for detecting a broadcast of a first message, comprising:
a processor;
memory in electronic communication with the processor;
instructions stored in the memory, the instructions being executable by the processor to:
receive a second message that is a System Information Type 3 message at one or more of a general packet radio service (GPRS) and a non-GPRS wireless communication device, wherein the System Information Type 3 message comprises a System Information Type 21 indicator when a WHERE field is not included in the System Information Type 3 message, and wherein the System Information Type 3 message indicates a System Information Type 9 message has been broadcast when the WHERE field is included in the System Information Type 3 message;
decode the second message; and
use the second message to determine whether a first message has been broadcast, wherein the first message includes a list of authorized access classes and a subcategory of wireless communication devices targeted by barring indications.

39. The wireless communication device of claim 38, wherein the first message is a System Information Type 21 message.

40. The wireless communication device of claim 39, wherein the instructions executable to use the second message to determine whether a System Information Type 21 message has been broadcast comprise instructions executable to:
determine that the second message comprises a WHERE field;
decode all fields from System Information Type 3 Rest Octets in the System Information Type 3 message; and
determine whether the System Information Type 3 Rest Octets comprise a System Information Type 21 message indicator.

41. The wireless communication device of claim 40, wherein the System Information Type 3 Rest Octets does not comprise a System Information Type 21 message indicator, and wherein the instructions executable to use the second message to determine whether a System Information Type 21 message has been broadcast further comprise instructions executable to determine that a System Information Type 21 message is not broadcast in a cell.

42. The wireless communication device of claim 40, wherein the System Information Type 3 Rest Octets comprise a System Information Type 21 message indicator, and wherein the instructions executable to use the second message to determine whether a System Information Type 21 message has been broadcast further comprise instructions executable to determine that a System Information Type 21 message is broadcast in a cell.

43. The wireless communication device of claim 42, wherein the System Information Type 3 message further comprises a System Information Type 21 position indicator.

44. The wireless communication device of claim 43, wherein the System Information Type 21 position indicator is set to BCCH Norm.

45. The wireless communication device of claim 43, wherein the System Information Type 21 position indicator is set to BCCH Extended.

46. The wireless communication device of claim 39, wherein the instructions are further executable to receive a third message, wherein the third message indicates that the second message has been broadcast.

47. The wireless communication device of claim 46, wherein the instructions are further executable to determine that the third message does not comprise a WHERE field, wherein the second message is a System Information Type 9 message, and wherein the third message is a System Information Type 3 message.

48. The wireless communication device of claim 47, wherein the System Information Type 9 message does not comprise a System Information Type 21 message indicator, and wherein the instructions executable to use the second message to determine whether a System Information Type 21 message has been broadcast further comprise instructions executable to determine that a System Information Type 21 message is not broadcast in a cell.

49. The wireless communication device of claim 47, wherein the System Information Type message comprises a System Information Type 21 message indicator, and wherein the instructions executable to use the second message to determine whether a System Information Type 21 message has been broadcast further comprise instructions executable to determine that a System Information Type 21 message is broadcast in a cell.

50. The wireless communication device of claim 38, wherein the barring indications comprises Extended Access Barring information.

51. A non-transitory computer-readable medium having instructions thereon, the instructions comprising:
 code for causing a base station to determine that a first message is to be broadcast in a cell, wherein the first message includes a list of authorized access classes and a subcategory of wireless communication devices targeted by barring indications;
 code for causing the base station to generate a second message that is a System Information Type 3 message, the second message comprises an indication that the first message is to be broadcast, wherein the indication comprises a System Information Type 21 indicator when a WHERE field is not included in the System Information Type 3 message, and wherein the indication indicates a System Information Type 9 message has been broadcast when the WHERE field is included in the System Information Type 3 message; and
 code for causing the base station to broadcast the second message to general packet radio service (GPRS) and non-GPRS wireless communication devices.

52. The non-transitory computer-readable medium of claim 51, wherein the first message is a System Information Type 21 message.

53. A non-transitory computer-readable medium having instructions thereon, the instructions comprising:
 code for causing one or more of a general packet radio service (GPRS) and a non-GPRS wireless communication device to receive a second message that is a System Information Type 3 message, wherein the System Information Type 3 message comprises a System Information Type 21 indicator when a WHERE field is not included in the System Information Type 3 message, and wherein the System Information Type 3 message indicates a System Information Type 9 message has been broadcast when the WHERE field is included in the System Information Type 3 message;
 code for causing the one or more of a GPRS and a non-GPRS wireless communication device to decode the second message; and
 code for causing the one or more of a GPRS and a non-GPRS wireless communication device to use the second message to determine whether a first message has been broadcast, wherein the first message includes a list of authorized access classes and a subcategory of wireless communication devices targeted by barring indications.

54. The non-transitory computer-readable medium of claim 53, wherein the first message is a System Information Type 21 message.

55. A wireless communication device for signaling a broadcast of a message, comprising:
 means for determining that a first message is to be broadcast in a cell, wherein the first message includes a list of authorized access classes and a subcategory of wireless communication devices targeted by barring indications;
 means for generating a second message that is a System Information Type 3 message, the second message comprises an indication that the first message is to be broadcast, wherein the indication comprises a System Information Type 21 indicator when a WHERE field is not included in the System Information Type 3 message, and wherein the indication indicates a System Information Type 9 message has been broadcast when the WHERE field is included in the System Information Type 3 message; and
 means for broadcasting the second message to general packet radio service (GPRS) and non-GPRS wireless communication devices.

56. A wireless communication device for detecting a broadcast of a first message, comprising:
 means for receiving a second message that is a System Information Type 3 message at one or more of a general packet radio service (GPRS) and a non-GPRS wireless communication device, wherein the System Information Type 3 message comprises a System Information Type 21 indicator when a WHERE field is not included in the System Information Type 3 message, and wherein the System Information Type 3 message indicates a System Information Type 9 message has been broadcast when the WHERE field is included in the System Information Type 3 message;
 means for decoding the second message; and
 means for using the second message to determine whether a first message has been broadcast, wherein the first message includes a list of authorized access classes and a subcategory of wireless communication devices targeted by barring indications.

* * * * *